(12) United States Patent
Rousselet et al.

(10) Patent No.: US 9,878,597 B2
(45) Date of Patent: Jan. 30, 2018

(54) PANE WITH HIGH-FREQUENCY TRANSMISSION

(71) Applicant: SAINT-GOBAIN GLASS FRANCE, Courbevoie (FR)

(72) Inventors: Noemie Rousselet, Paris (FR); Stefan Droste, Herzogenrath (DE); Michael Behmke, Duesseldorf (DE); Bernd Stelling, Bielefeld (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/433,855

(22) PCT Filed: Sep. 27, 2013

(86) PCT No.: PCT/EP2013/070233
§ 371 (c)(1),
(2) Date: Apr. 6, 2015

(87) PCT Pub. No.: WO2014/060203
PCT Pub. Date: Apr. 24, 2014

(65) Prior Publication Data
US 2015/0343884 A1    Dec. 3, 2015

(30) Foreign Application Priority Data
Oct. 15, 2012    (EP) .................................. 12188537

(51) Int. Cl.
*G02B 5/30*    (2006.01)
*B60J 1/02*    (2006.01)
(Continued)

(52) U.S. Cl.
CPC ................. *B60J 1/001* (2013.01); *B32B 7/12* (2013.01); *B32B 17/10036* (2013.01);
(Continued)

(58) Field of Classification Search
CPC ...................................................... G02B 5/208
See application file for complete search history.

(56) References Cited

U.S. PATENT DOCUMENTS 6,045,896 A    4/2000    Boire et al.
6,356,236 B1    3/2002    Maeuser et al.
(Continued)

FOREIGN PATENT DOCUMENTS

DE    195 08 042    10/1995
DE    19541743 A1    6/1996
(Continued)

OTHER PUBLICATIONS

PCT Written Opinion dated Jan. 3, 2014 for PCT Application PCT/EP2013/070233 filed on Sep. 27, 2013 in the name of Saint-Gobain Glass France.
(Continued)

*Primary Examiner* — Derek S Chapel
(74) *Attorney, Agent, or Firm* — Steinfl + Bruno LLP

(57) ABSTRACT

A panel, having at least: at least one first panel having an outer face and an inner face, at least one transparent, electrically-conductive coating, which is arranged on the outer face and/or on the inner face of the first panel, and at least one region having at least one outer de-coated structure and one inner de-coated structure, the transparent, electrically-conductive coating being located between the outer de-coated structure and the inner de-coated structure and inside the inner de-coated structure.

35 Claims, 25 Drawing Sheets

Figure 1:
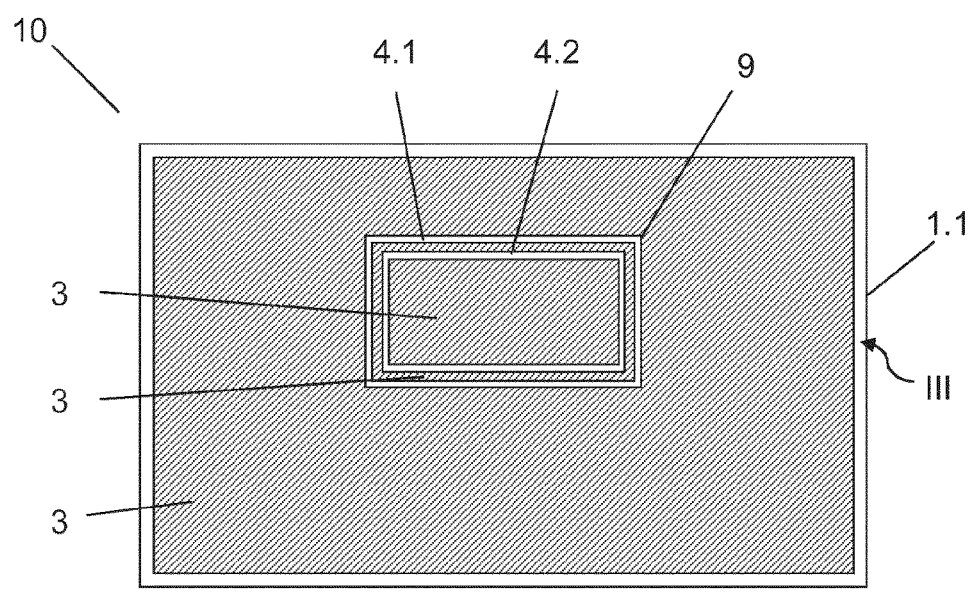

(51) Int. Cl.

| | | |
|---|---|---|
| *B60J 1/00* | (2006.01) | |
| *B32B 37/14* | (2006.01) | |
| *E06B 3/66* | (2006.01) | |
| *E06B 7/12* | (2006.01) | |
| *B32B 7/12* | (2006.01) | |
| *G02B 5/20* | (2006.01) | |
| *B32B 17/10* | (2006.01) | |
| *H01Q 1/12* | (2006.01) | |
| *H01Q 15/00* | (2006.01) | |

(52) U.S. Cl.
CPC .. *B32B 17/10183* (2013.01); *B32B 17/10192* (2013.01); *B32B 37/14* (2013.01); *B60J 1/002* (2013.01); *E06B 3/66* (2013.01); *E06B 7/12* (2013.01); *G02B 5/208* (2013.01); *H01Q 1/1271* (2013.01); *B32B 2307/202* (2013.01); *B32B 2307/412* (2013.01); *B32B 2605/006* (2013.01); *B32B 2605/08* (2013.01); *H01Q 15/0013* (2013.01)

(56) References Cited

U.S. PATENT DOCUMENTS

| | | | |
|---|---|---|---|
| 2003/0080909 A1 | 5/2003 | Voeltzel | |
| 2004/0200821 A1 | 10/2004 | Voeltzel | |
| 2010/0052992 A1* | 3/2010 | Okamura | H01Q 1/526 |
| | | | 343/700 MS |
| 2011/0108537 A1* | 5/2011 | Schall | B32B 17/10036 |
| | | | 219/201 |
| 2011/0139756 A1 | 6/2011 | Raible et al. | |
| 2011/0266275 A1 | 11/2011 | Rateiczak | |
| 2015/0343884 A1 | 12/2015 | Rousselet et al. | |

FOREIGN PATENT DOCUMENTS

| | | |
|---|---|---|
| DE | 198 17 712 | 2/2000 |
| DE | 103 14 094 | 3/2004 |
| EP | 0 717 459 | 6/1996 |
| EP | 0 847 965 | 6/1998 |
| EP | 0 378 917 | 5/2004 |
| EP | 1 605 729 | 12/2005 |
| EP | 2 139 049 | 12/2009 |
| EP | 2 200 097 | 6/2010 |
| EP | 2906417 A1 | 8/2015 |
| JP | 2008068519 A | 3/2008 |
| MX | PA05010792 A | 12/2005 |
| MX | PA05012737 A | 2/2006 |
| WO | 2004/093497 A1 | 10/2004 |
| WO | 2004/108618 A2 | 12/2004 |
| WO | 2010/043598 | 4/2010 |
| WO | 2012/066324 | 5/2012 |
| WO | 2014/060203 A1 | 4/2014 |

OTHER PUBLICATIONS

PCT International Preliminary Report on Patentability dated Apr. 21, 2015 for PCT Application PCT/EP2013/070233 filed on Sep. 27, 2013 in the name of Saint-Gobain Glass France.

PCT International Search Report dated Jan. 3, 2014 for PCT Application PCT/EP2013/070233 filed on Sep. 27, 2013 in the name of Saint-Gobain Glass France.

* cited by examiner

PANE WITH HIGH-FREQUENCY TRANSMISSION

CROSS REFERENCE TO RELATED APPLICATIONS

The present application is the US national stage of International Patent Application PCT/EP2013/070233 filed internationally on Sep. 27, 2013 which, in turn, claims priority to European Patent Application No. 12188534.7 filed on Oct. 15, 2012.

The invention relates to a pane, in particular a vehicle window pane, with a transparent, electrically conductive coating and low transmission attenuation for electromagnetic radiation in the high-frequency range. The invention further relates to a method for producing such a pane and its use.

Current motor vehicles require a large number of technical devices for sending and receiving electromagnetic radiation for the operation of basic services such as radio reception, preferably in the bands AM, FM, or DAB, mobile telephony in the bands GSM 900 and DCS 1800, UMTS and LTE as well as satellite-supported navigation (GPS) and WLAN.

At the same time, modern vehicle glazings increasingly have all-sided and full-surface electrically conductive coatings transparent to visible light. These transparent, electrically conductive coatings protect, for example, interiors against overheating due to sunlight or against cooling, by reflecting incident thermal radiation, as is known from EP 378917 A. Transparent, electrically conductive coatings can effect targeted warming of the pane by application of an electrical voltage, as is known from WO 2010/043598 A1.

Common to the transparent, electrically conductive coatings is the fact that they are also impermeable to electromagnetic radiation in the high-frequency range. An all-sided and full-surface glazing of a vehicle with transparent, electrically conductive coatings renders transmission and reception of electromagnetic radiation in the interior no longer possible. For the operation of sensors such as rain sensors, camera systems, or fixed antennas, one or two localized regions of the electrically conductive, transparent coating are de-coated. These de-coated regions form a so-called communication window or data transmission window and are known, for example, from EP 1 605 729 A2.

Since the transparent, electrically conductive coatings affect the coloring and reflectance of a pane, communications windows are visually very conspicuous. Disruptions in the drivers field of view, which impair driving safety and which must absolutely be avoided, can result from de-coated regions. Consequently, communication window are arranged at inconspicuous positions on the pane, for example, in the region of the inside rearview mirror of a windshield, and covered by black imprints and plastic screens.

Such communication windows are too small to enable the transmission and reception of high-frequency electromagnetic radiation, such as is necessary, for example, for mobile telephony and satellite-supported navigation. However, the user expects to be able to operate mobile telephones at any position in the interior of a vehicle.

From EP 0 717 459 A1, US 2003/0080909 A1, and DE 198 17 712 C1, panes with a metal coating are known, all of which have grid-formed de-coating of the metal coating. The grid-formed de-coating acts as a low pass filter for incident high-frequency electromagnetic radiation. The distances between the grid elements are small compared to the wavelength of the high-frequency electromagnetic radiation and thus a relatively large fraction of the coating is patterned and vision through the pane is relatively greatly impaired. The de-coating of a relatively large fraction of the layer is tedious and cost intensive.

The object of the present invention consists in providing a pane with a transparent, electrically conductive coating, which enables adequate transmission of high-frequency electromagnetic radiation for the operation of mobile telephony in the bands GSM 900 and DCS 1800, UMTS, and LTE as well as satellite-supported navigation (GPS) and WLAN, which is visually appealing and does not substantially restrict vision through the pane and which can be produced economically. These and other objects are accomplished according to the proposal of the invention by a pane with the characteristics of the independent claims. Advantageous embodiments of the invention are indicated by the characteristics of the subclaims.

A method for producing a pane with high-frequency transmission as well as the use of such a pane are evident from further independent claims.

A pane according to the invention comprises at least one first pane with an outer face and an inner face, at least one transparent, electrically conductive coating, which is arranged on the outer face and/or the inner face of the first pane and at least one region with at least one outer de-coated structure and one inner de-coated structure, wherein the transparent, electrically conductive coating is situated between the outer de-coated structure and the inner de-coated structure and inside the inner de-coated structure.

The present invention is based on the knowledge that a pane according to the invention with outer and inner de-coated structures has adequately high permeability for high-frequency electromagnetic radiation. In contrast to panes according to the prior art, it is unnecessary to de-coat the transparent, electrically conductive coating in large areas. De-coated structures with only a low line width that do not substantially impair the vision through the pane and the aesthetic appearance of the pane suffice.

The pane according to the invention can be implemented for this as single pane made of a first pane with a transparent, electrically conductive coating.

Alternatively, the pane according to the invention can be implemented as a composite pane. A composite pane according to the invention preferably comprises preferably a first pane, an intermediate layer, and a second pane as well as at least one transparent, electrically conductive coating, which is arranged between the intermediate layer and the first pane and/or between the intermediate layer and the second pane. The transparent, electrically conductive coating can also be arranged on a carrier film, which is preferably laminated inside the first and the second pane via other intermediate layers.

The first pane and/or the second pane can be, both in the case of the single pane and the case of the composite pane, a single pane or an already laminated composite pane made of two or more panes, which form a fixedly bonded unit by lamination.

In an advantageous embodiment of the pane according to the invention, the outer de-coated structure and the inner de-coated structure have the shape of a rectangle, a rhombus, a trapezoid, and, in particular, of a square. Alternatively, the de-coated structures can have the shape of a cross, an oval, or a circle. With these shapes, it has been possible to obtain particularly high permeabilities for high-frequency electromagnetic radiation.

Alternatively, the de-coated structures can have the shape of a hexagon, in particular of a regular hexagon with equally long sides or of an octagon, in particular of a regular octagon. With these shapes, it has been possible to obtain particularly high permeabilities for high-frequency electromagnetic radiation under different polarization directions.

In an advantageous embodiment of the pane according to the invention, the outer de-coated structure is completely surrounded by the transparent, electrically conductive coating. In other words: The outer de-coated structure is completely surrounded on its outer edge by the transparent electrically conductive coating.

In another advantageous embodiment of the pane according to the invention, the inner de-coated structure is completely surrounded on its inner edge by the transparent, electrically conductive coating.

In another advantageous embodiment, the intermediate region between the outer de-coated structure and the inner de-coated structure is completely filled with the transparent, electrically conductive coating. The double structure thus created has the particular advantage that high permeabilities for high-frequency electromagnetic radiation are obtained with only a small patterning effort. At the same time, processing time and processing costs can be kept low.

In an advantageous embodiment of the pane according to the invention, the distance b between the de-coated structures is from 0.5 mm to 30 mm, preferably from 1 mm to 5 mm. With this distance b, it was possible to observe particularly low transmission attenuations for high-frequency electromagnetic radiation. Needless to say, the optimal distance b depends on the frequency of the high-frequency electromagnetic radiation for which the transmission through the pane is optimized. This can be determined by simple simulations.

The outer de-coated structure and the inner de-coated structure have, in particular, the same shape. In a particularly advantageous embodiment, the outer de-coated structure and the inner de-coated structure are arranged concentrically to one another. In other words: The two de-coated structures have a common center and, with the same shape, a constant distance between the de-coated lines of the structure.

In another advantageous embodiment of a pane according to the invention, a plurality of de-coated structures with different shapes are arranged on a pane. This has the particular advantage that a greater bandwidth for multiple frequency ranges and different polarization can be obtained.

In another advantageous embodiment, the inner region of the inner de-coated structure is completely filled with the transparent, electrically conductive coating or merely has one or a plurality of other double structures consisting of other smaller, outer de-coated structures and other smaller, inner de-coated structures. This makes it possible to obtain particularly high permeabilities for high-frequency electromagnetic radiation with only a small patterning effort. At the same time, processing time and processing costs can be kept low.

In another advantageous embodiment of a pane according to the invention, the outer de-coated structure and the inner de-coated structure are connected to each other via at least one additional de-coated line and preferably via 2 to 100 additional de-coated lines. The additional de-coated line is preferably rectilinearly and/or orthogonally arranged to the de-coated structures. The distance between the lines is preferably less than one fourth of the wavelength $\lambda$ of the high-frequency electromagnetic radiation and particularly preferably from $\lambda/20$ to $\lambda/500$. Alternatively, the additional de-coated line can have a curved course and, for example, a sinusoidal course. The additional de-coated lines have the particular advantage that fewer disruptive field-induced currents can form between the outer de-coated structure 4.1 and the inner de-coated structure 4.2. Thus, particularly high permeabilities for high-frequency electromagnetic radiation can be obtained. In a particularly advantageous embodiment, the area of the additional de-coated lines between the outer de-coated structure and the inner de-coated structure is from 0.1% to 25% and preferably from 1% to 5% of the area of the intermediate region between the outer de-coated structure and the inner de-coated structure. Thus, high permeabilities for high-frequency electromagnetic radiation can be obtained with only a small patterning effort. At the same time, processing time and processing costs can be kept low.

In another advantageous embodiment, the de-coated structures according to the invention have a line width d from 0.025 mm to 0.3 mm and preferably from 0.03 mm to 0.14 mm. Such line widths are technically simple to produce, for example, by laser patterning. Furthermore, they hardly impair the optical vision through the pane.

The transparent, electrically conductive coating comprises at least one region with de-coated structures, preferably at least four regions and particularly preferably 10 to 50 regions. The regions are preferably arranged horizontally and/or vertically. A slight deviation from the horizontal and/or vertical arrangement can result from the fact that the coated structures in the transparent, electrically conductive coating are de-coated on a flat pane and the pane with the de-coated structures is then bent. With such a distribution of the de-coated lines, particularly low transmission attenuation and favorable distribution of the reception and transmission power behind the pane can be obtained. A region with horizontally and/or vertically arranged de-coated structures can also have, in its entirety, an angle $\alpha$ relative to the horizontal, for example, from 10° to 80° and preferably from 30° to 50°.

The area fraction of the regions that comprise the de-coated structures and the intermediate spaces directly adjacent de-coated structures is advantageously from 7% to 25% of the total area of the pane. With this area fraction, particularly low transmission attenuation and favorable distribution of the reception and transmission power behind the pane can be obtained. At the same time, there is a favorable correlation of the improvement of the transmission to the processing costs for the de-coating.

The number of regions and de-coated structures is governed by the requirements for transmission attenuation and the dimensions of the pane. In the case of a windshield, the size and configuration of the interior space in particular must be taken into account.

In an advantageous embodiment of the invention as a windshield, the regions are arranged with the de-coated structures outside the A-field of view of the driver. The A-field of view of the driver is defined, for example, in accordance with Annex 18 ECE R43. Although the line widths of the de-coated structures according to the invention are very thin and, consequently, visually inconspicuous, it is considered imperative to avoid any disruption in the field of view of the driver.

In an advantageous embodiment of the invention, the minimum distance h between two adjacent regions with de-coated structures is from 1 mm to 100 mm, preferably from 1 mm to 10 mm and particularly preferably from 2 mm to 6 mm. The minimum distance h depends in particular on the frequency for which the pane is intended to have optimum transmission. The minimum distance h is preferably the horizontal or vertical minimum distance between two adjacent regions. For minimum distances h of less than 1 mm, a strong coupling between the de-coated structures that results in an undesirable increase in transmission attenuation can occur.

The length l of the de-coated structures and in particular of the maximum length of the outer de-coated structure is preferably from 10 mm to 150 mm. The length l is adapted to the frequency band or the frequency bands for which the pane is to have the least possible transmission attenuation. Furthermore, the length l depends on the wavelength of the high-frequency electromagnetic radiation, the sheet resistance of the transparent, electrically conductive coating, and the effective relative permittivity $\in_{\mathit{eff}}$ of the panes and of the intermediate layer.

For mobile telephony operation in the GSM 900 band, the length l is preferably from 35 mm to 120 mm and particularly preferably from 40 mm to 60 mm. In the region of 1.8 GHz, the length l with low transmission attenuation is preferably from 15 mm to 35 mm. The optimal length l with low transmission attenuation with adequate bandwidth can be determined by the person skilled in the art in the context of simple simulations and experiments.

In another preferred embodiment, the length l of the de-coated structures and in particular the maximum length of the outer de-coated structure, disregarding the sheet resistance, is from $\lambda/(7*\sqrt{\in_{\mathit{eff}}})$ to $(3*\lambda)/(2*\sqrt{\in_{\mathit{eff}}})$, where $\lambda$ indicates the wavelength for which the transmission is intended to be optimized. The length l is preferably roughly $\lambda/(4*\sqrt{\in_{\mathit{eff}}})$. As investigations of the inventor revealed, structures with lengths l in this range have low transmission attenuation with adequate bandwidth.

In an advantageous embodiment of the pane according to the invention, $b/l \leq \frac{1}{5}$, where b is the distance between the outer de-coated structure and the inner de-coated structure. As investigations of the inventor revealed, such ratios between the distance b and the length l deliver good and adequate bandwidth in the transmission through the pane according to the invention in the required wavelength range for which the transmission had been optimized.

The sides of the de-coated structures are arranged, in the case of rectangular, square, or trapezoidal shapes, preferably horizontally or vertically, in particular with regard to the arrangement in the installed state of the pane at its point of use. Horizontally running lines of the de-coated structures are particularly advantageous in the installed position since they are visually less disruptive and cause less scattered light and reflections than non-horizontally or non-vertically running lines.

In an advantageous embodiment of the pane according to the invention, at least one other outer de-coated structure is arranged inside a first inner de-coated structure and one other inner de-coated structure is arranged inside the other outer de-coated structure. The other de-coated structures preferably have the same shape and are preferably arranged one over another and concentrically relative to the first de-coated structures. Needless to say, the other de-coated structures can also have different shapes or their center can be arranged offset. The distance between the first outer de-coated structure and the first inner de-coated structure is preferably equal to the distance between the other outer de-coated structure and the other inner de-coated structure. Needless to say, the distances need not be equal. Due to the different lengths of the outer de-coated structures arranged nestled in each other, such panes according to the invention have improved transmission for a plurality of frequency ranges.

The pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. Suitable types of glass are known, for example, from EP 0 847 965 B1.

The thickness of the pane can vary widely and thus be ideally adapted to the requirements of the individual case. Preferably, panes with the standard thicknesses from 1.0 mm to 25 mm and preferably from 1.4 mm to 2.1 mm are used. The size of the pane can vary widely and is governed by the size of the application according to the invention.

In an advantageous embodiment of the invention, the pane has dielectric properties and a relative permittivity from 2 to 8. A pane made of polymers preferably has a relative permittivity from 2 to 5. A pane made of glass preferably has a relative permittivity from 6 to 8 and in particular of roughly 7.

The pane can have any three-dimensional shape. Preferably, the three-dimensional shape has no shadow zones such that it can, for example, be coated by cathodic sputtering. Preferably, the pane is planar or slightly or greatly curved in one or more spatial directions. The pane can be colorless or colored.

In a preferred embodiment of the pane according to the invention as a composite pane, at least one of the panes contains glass and at least one of the panes contains plastic. In particular, in the case of a use according to the invention as a vehicle window pane, the outer pane contains glass and the inner pane contains plastic.

The panes of the composite pane are bonded to each other via at least one intermediate layer. The intermediate layer preferably contains a thermoplastic polymer, such as polyvinyl butyral (PVB), ethylene vinyl acetate (EVA), polyurethane (PU), polyethylene terephthalate (PET), or a plurality of layers thereof, preferably with thicknesses from 0.3 mm to 0.9 mm.

The transparent, electrically conductive coating according to the invention is permeable for electromagnetic radiation, preferably electromagnetic radiation of a wavelength from 300 to 1,300 nm, in particular for visible light. "Permeable" means that the total transmission of the composite pane complies with the legal requirements for windshields and front side windows and is permeable in particular for visible light preferably >70% and in particular >75%. For rear side windows and rear windows "permeable" can also mean 10% to 70% light transmission.

The transparent, electrically conductive coating is preferably a functional coating, particularly preferably a functional coating with anti-sunlight protection. A coating with anti-sunlight protection has reflecting properties in the infrared range and thus in the range of sunlight. Thus, the heating of the interior of a vehicle or building as a result of sunlight is advantageously reduced. Such coatings are known to the person skilled in the art and typically contain at least one metal, in particular silver or a silver-containing alloy. The transparent, electrically conductive coating can include a sequence of a plurality of individual layers, in particular at least one metal layer and dielectric layers that include, for example, at least one metal oxide. The metal oxide preferably contains zinc oxide, tin oxide, indium oxide, titanium oxide, silicon oxide, aluminum oxide, or the like, as well as combinations of one or a plurality thereof. The dielectric material can also contain silicon nitride, silicon carbide, or aluminum nitride.

This layer structure is generally obtained by a sequence of deposition procedures that are performed by a vacuum method, such as magnetic field assisted cathodic sputtering. Very fine metal layers, which contain, in particular, titanium or niobium, can also be provided on both sides of the silver layer. The lower metal layer serves as an adhesion and crystallization layer. The upper metal layer serves as a protective and getter layer to prevent a change in the silver during the other process steps.

Particularly suitable transparent, electrically conductive coatings include at least one metal, preferably silver, nickel, chromium, niobium, tin, titanium, copper, palladium, zinc, gold, cadmium, aluminum, silicon, tungsten or alloys thereof, and/or at least one metal oxide layer, preferably tin-doped indium oxide (ITO), aluminum-doped zinc oxide (AZO), fluorine-doped tin oxide (FTO, $SnO_2$:F), antimony-doped tin oxide (ATO, $SnO_2$:Sb), and/or carbon nanotubes and/or optically transparent, electrically conductive polymers, preferably poly(3,4-ethylenedioxythiophenes), polystyrene sulfonate, poly(4,4-dioctylcylopentadithiophen), 2,3-dichloro-5,6-dicyano-1,4-benzoquinone, mixtures and/or copolymers thereof.

The thickness of the transparent, electrically conductive coating can vary widely and can be adapted to the requirements of the individual case. It is essential that the thickness of the transparent, electrically conductive coating not be so great that it becomes impermeable for electromagnetic radiation, preferably electromagnetic radiation of a wavelength from 300 to 1.300 nm and in particular visible light. The transparent, electrically conductive coating preferably has a layer thickness from 10 nm to 5 µm and particularly preferably from 30 nm to 1 µm.

The sheet resistance of the transparent, electrically conductive coating is preferably from 0.35 ohm/square to 200 ohm/square, preferably 0.5 ohm/square to 200 ohm/square, most particularly preferably from 0.6 ohm/square to 30 ohm/square, and, in particular, from 2 ohm/square to 20 ohm/square. The transparent, electrically conductive coating can, in principle, have even lower sheet resistances than 0.35 ohm/square, in particular if, in its use, only a low light transmission is required. The transparent, electrically conductive coating preferably has good infrared reflecting properties and/or particularly low emissivity (low-E).

In an advantageous embodiment of the composite pane according to the invention, at least one transparent, electrically conductive layer is situated on at least one of the inner sides of the panes. In the case of a pane composite made of two panes, a transparent, electrically conductive layer can be situated on the inner side of one or the other panes. Alternatively, a transparent, electrically conductive layer can, in each case, be situated on each of the two inner sides. In the case of a pane composite made of more than two panes, multiple transparent, electrically conductive coatings can also be situated on multiple inner sides of the panes. In that case, the regions with de-coated structures are preferably arranged congruently in the different coatings in order to ensure low transmission attenuation.

Alternatively, a transparent, electrically conductive coating can be embedded between two thermoplastic intermediate layers. In that case, the transparent, electrically conductive coating is preferably applied on a carrier film or carrier pane. The carrier film or carrier pane preferably contains a polymer, in particular polyvinyl butyral (PVB), ethylene vinyl acetate (EVA), polyurethane (PU), polyethylene terephthalate (PET), or combinations thereof.

In an alternative embodiment of the invention, the transparent, electrically conductive layer or a carrier film with the transparent, electrically conductive layer is arranged on one side of a single pane.

The invention includes a method for producing a pane according to the invention as described above, wherein at least:
(a) the transparent, electrically conductive coating is applied on the outer face and/or the inner face of a first pane, and
(b) at least one region with at least one outer de-coated structure and one inner de-coated structure is introduced into the transparent, electrically conductive coating, wherein the transparent, electrically conductive coating is situated between the outer de-coated structure and the inner de-coated structure and inside the inner de-coated structure.

In an alternative embodiment of the method according to the invention, the transparent, electrically conductive coating can be applied on a carrier film, for example, a PET film. The carrier film can be bonded to the first pane directly or via at least one intermediate layer. The region with the de-coated structures can be introduced into the transparent, electrically conductive coating before or after the bonding to the first pane.

The application of the transparent, electrically conductive coating in process step (a) can be done using methods known per se, preferably by magnetic field assisted cathodic sputtering. This is particularly advantageous with regard to simple, rapid, economical, and uniform coating of the first pane. The transparent, electrically conductive coating can, however, also be applied, for example, by vapor deposition, chemical vapor deposition (CVD), plasma enhanced chemical vapor deposition (PECVD), or by wet chemical methods.

The first pane can be subjected to a temperature treatment after process step (a). The first pane with the electrically conductive coating is heated to a temperature of at least 200° C., preferably at least 300° C. The temperature treatment can serve to increase transmission and/or to reduce the sheet resistance of the transparent, electrically conductive coating.

The first pane can be bent after process step (a), typically at a temperature from 500° C. to 700° C. Since it is technically simpler to coat a flat pane, this approach is advantageous when the first pane is to be bent. Alternatively, the first pane can, however, also be bent before process step (a), for example, if the transparent, electrically conductive coating is unsuitable to withstand a bending process without damage.

The de-coating of the de-coated structures in the transparent, electrically conductive coating is preferably done by a laser beam. Methods for patterning thin metal films are known, for example, from EP 2 200 097 A1 or EP 2 139 049 A1. The width of the de-coating is preferably 10 µm to 1000 µm, particularly preferably 25 µm to 300 µm, and in particular 70 µm to 140 µm. In this range, a particularly clean and residue-free de-coating takes place using the laser beam. The de-coating by means of laser beam is particularly advantageous since the de-coated lines are optically very unobtrusive and the appearance and the vision through the pane is impaired only a little. The de-coating of a line of the width d, which is wider than a laser cut, is done by multiple passes of the line with the laser beam. Consequently, process duration and process costs rise with an increasing line width. Alternatively, the de-coating can be done by mechanical removal as well as by chemical or physical etching.

An advantageous improvement of the method according to the invention includes at least the following additional steps:

(c) Arranging a thermoplastic intermediate layer on the first pane and arranging a second pane on the thermoplastic intermediate layer, and
(d) Bonding the first pane and the second pane via the thermoplastic intermediate layer.

In process step (c), the first pane is advantageously arranged such that the one of its surfaces that is provided with the electrically conductive coating faces the intermediate layer. This has the particular advantage that the transparent, electrically conductive coating is protected against environmental influences and against touching by the user by lamination.

The thermoplastic intermediate layer can be implemented by a single thermoplastic film or even by two or more thermoplastic films that are arranged congruently one over another.

The bonding of the first and second pane in process step (d) is preferably done under the action of heat, vacuum, and/or pressure. Methods known per se for producing a pane can be used.

For example, so-called autoclave methods can be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a composite pane. Facilities of this type for producing composite panes are known and usually have at least one heating tunnel upstream from a pressing system. During the pressing procedure, the temperature is, for example, from 40° C. to 150° C. Combinations of calender and autoclave methods have proved particularly effective in practice. Alternatively, vacuum laminators can be used. These consist of one or a plurality of heatable and evacuable chambers in which the first pane and the second pane can be laminated within, for example, roughly 60 minutes at reduced pressures from 0.01 mbar to 800 mbar and temperatures from 80° C. to 170° C.

To produce a bent composite pane, the first pane and the second pane can be bent, before the process step (c), in a hot bending process known per se. The first and the second pane can advantageously be bent together such that the same curvature of the panes is ensured.

The invention further extends to the use of a pane as described above in a vehicle body or in a vehicle door of a means of transportation on land, on water, or in the air, in buildings as part of an external façade or as building windows and/or as a built-in part in furniture and appliances.

The use of a pane according to the invention as a windshield is particularly advantageous. Mobile phone base stations are, for example, installed along highways or expressways. The high-frequency, electromagnetic radiation can then arrive in the driving direction from the front through the windshield according to the invention into the interior of the motor vehicle. In cities, the mobile phone base stations are customarily installed on roofs or elevated positions and beam down from above. Satellite navigation signals likewise beam down from above to a vehicle. Since, to improve aerodynamics, windshields have a sharply inclined installed position, mobile phone signals or satellite navigation signals can also enter the vehicle interior from above through the pane.

Figure 2:
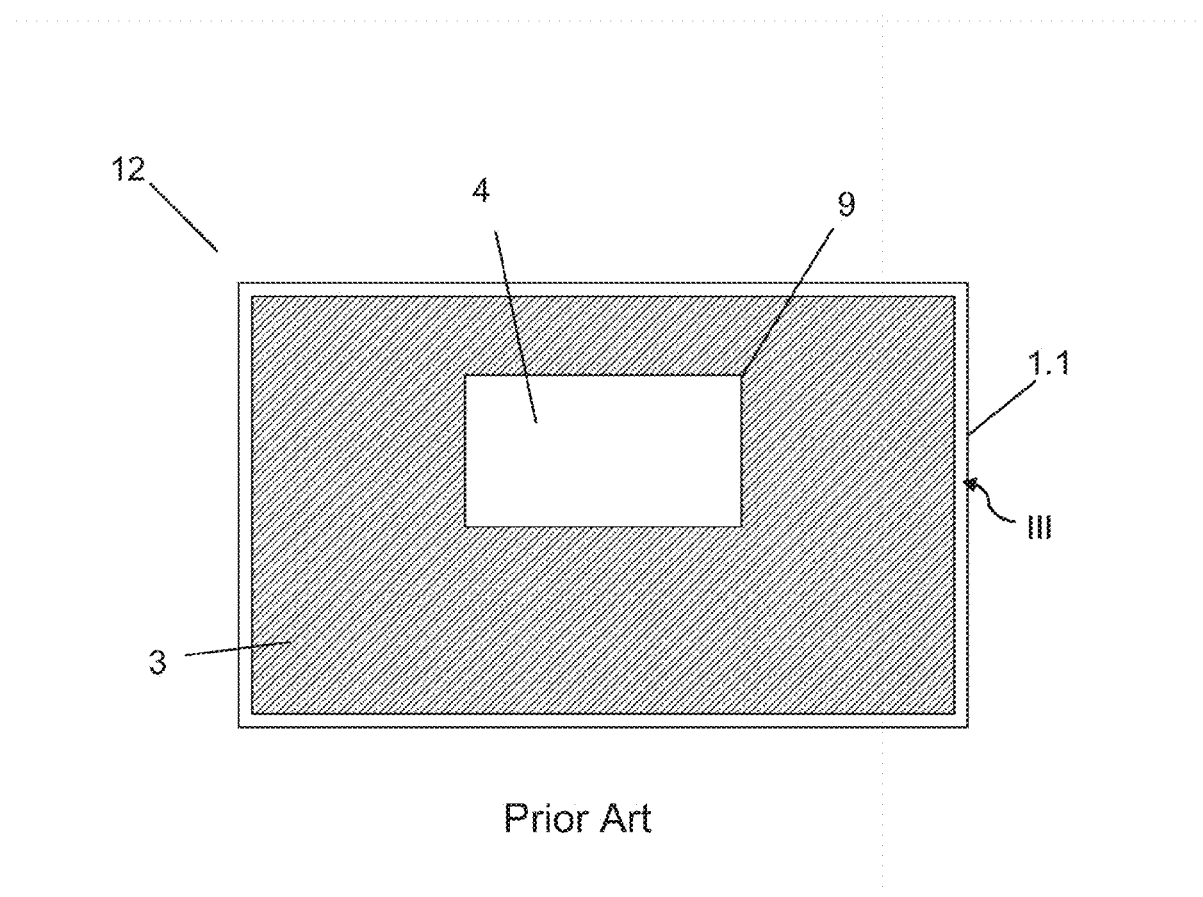
Figure 3A:
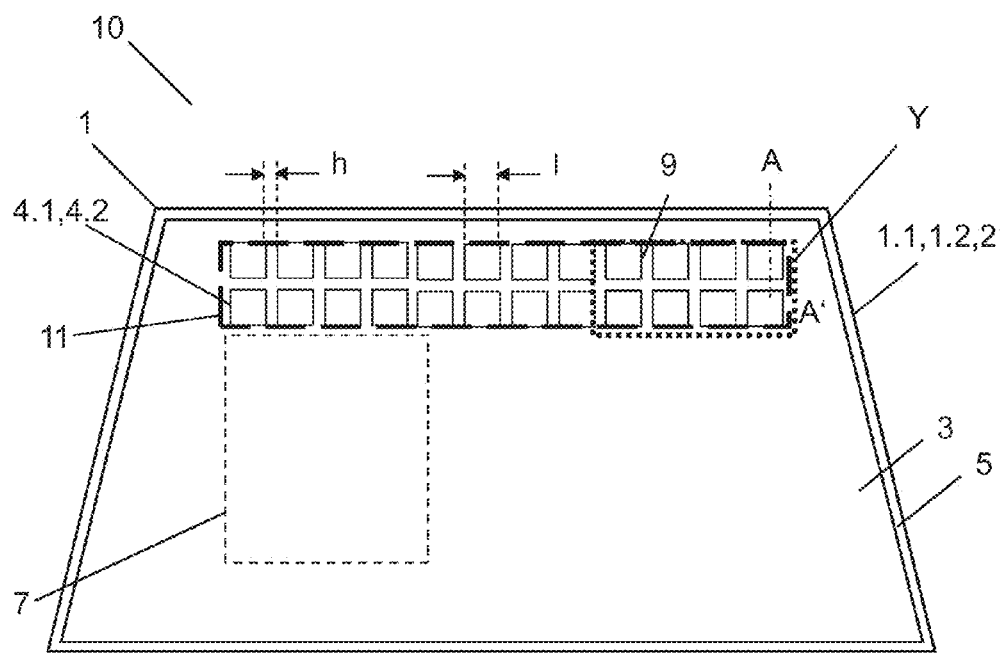
Figure 3B:
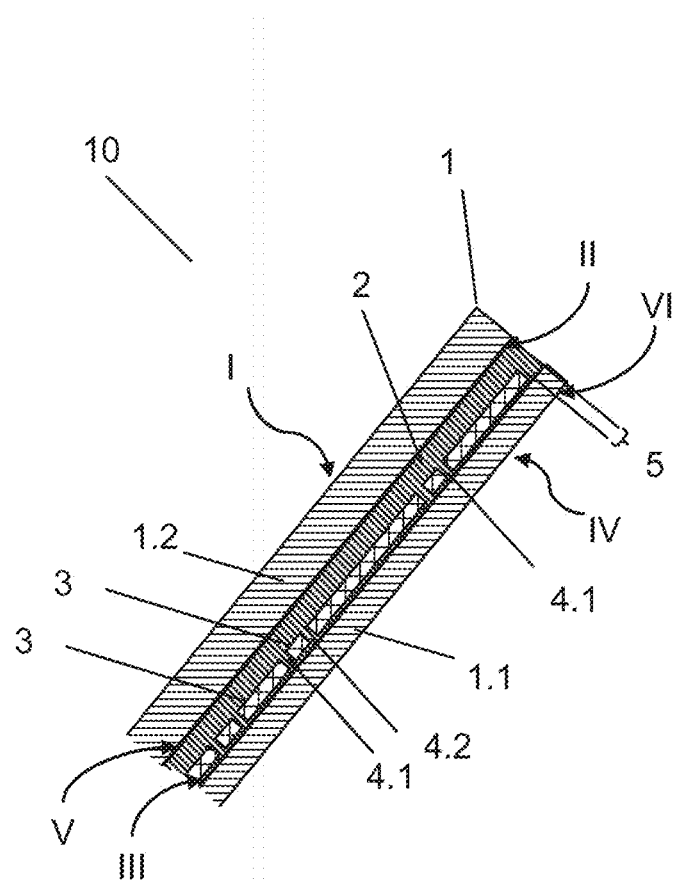
Figure 3C:
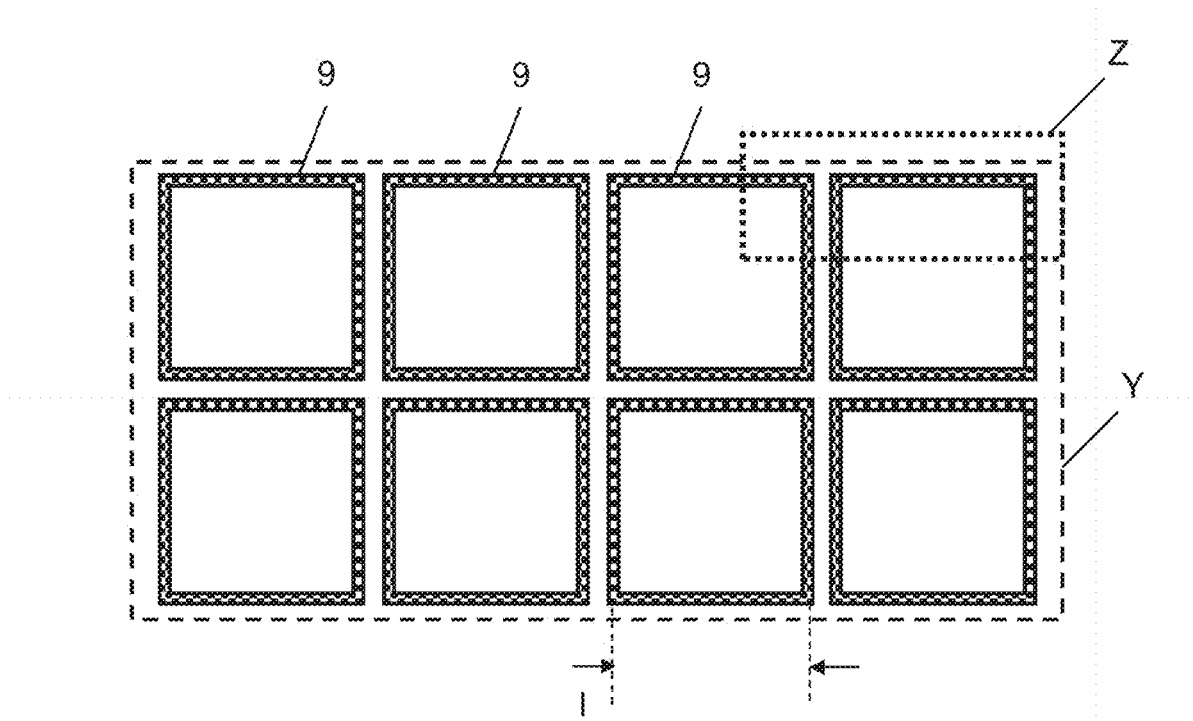
Figure 3D:
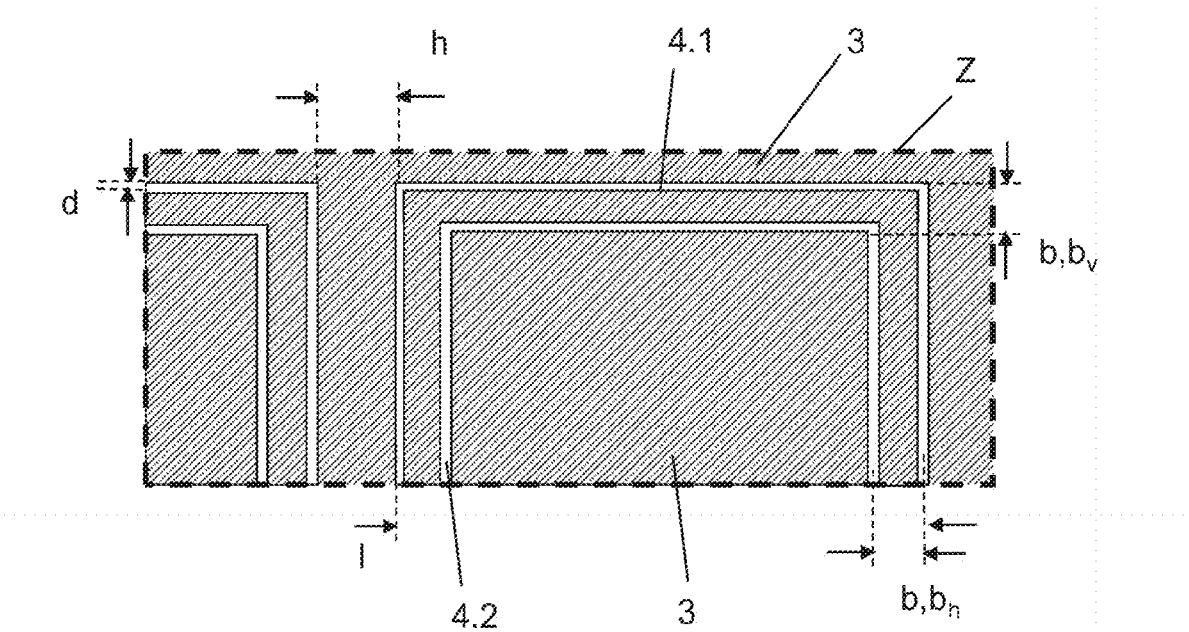
Figure 4:
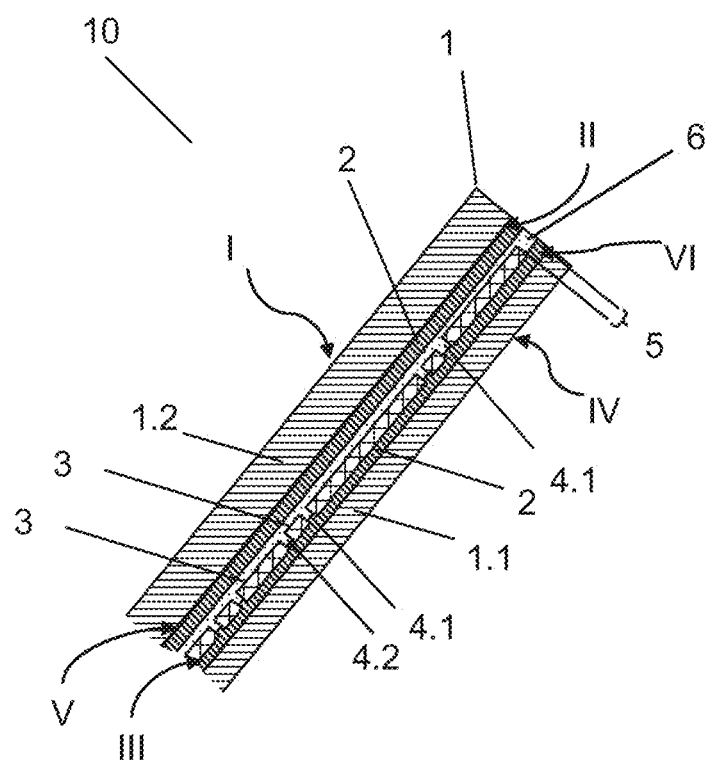
Figure 5:
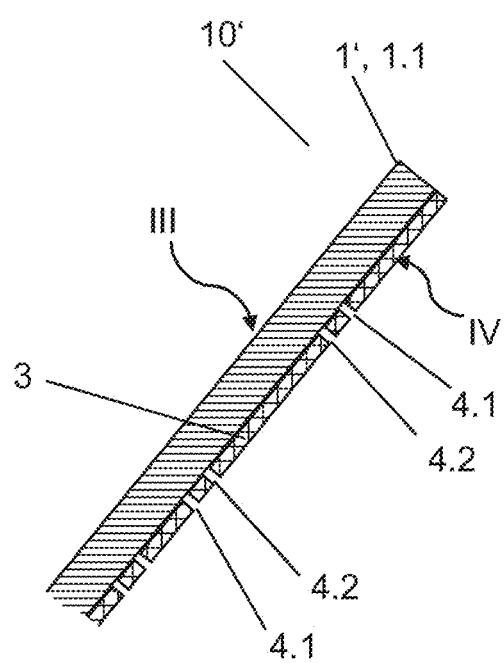
Figure 6:
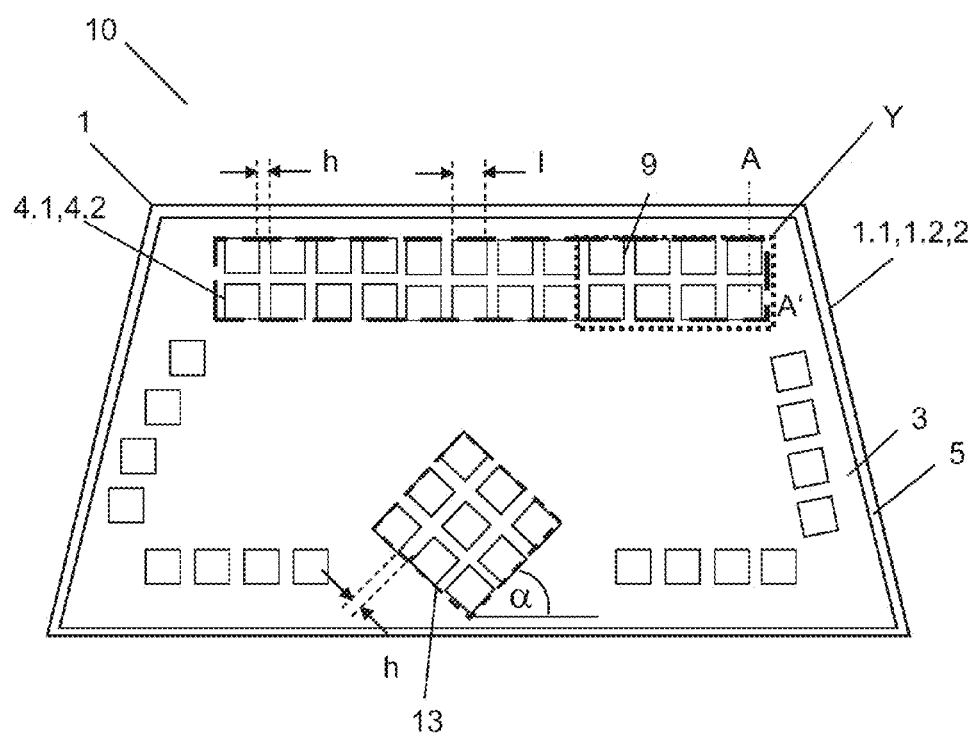
Figure 7:
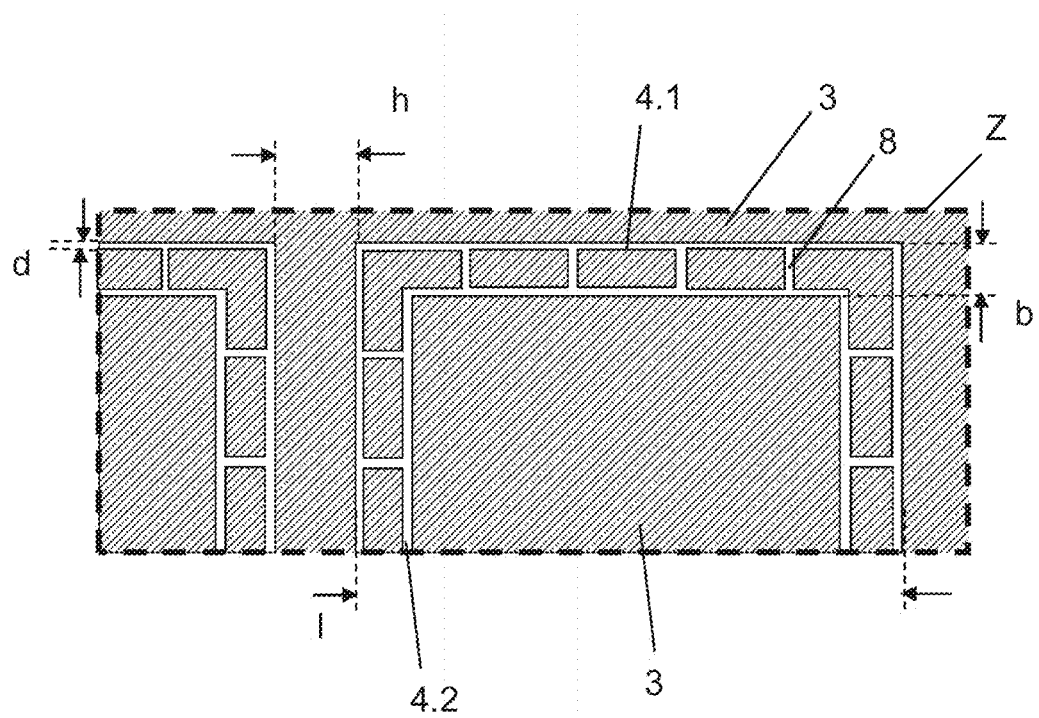
Figure 8:
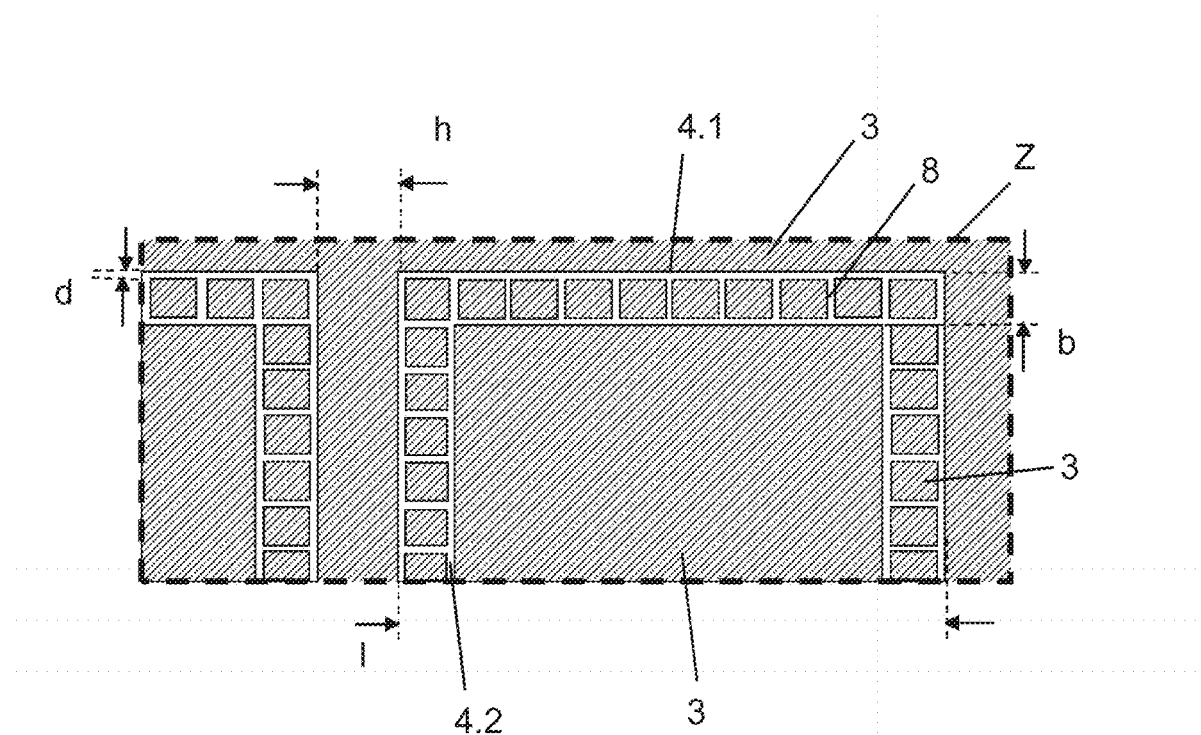
Figure 9:
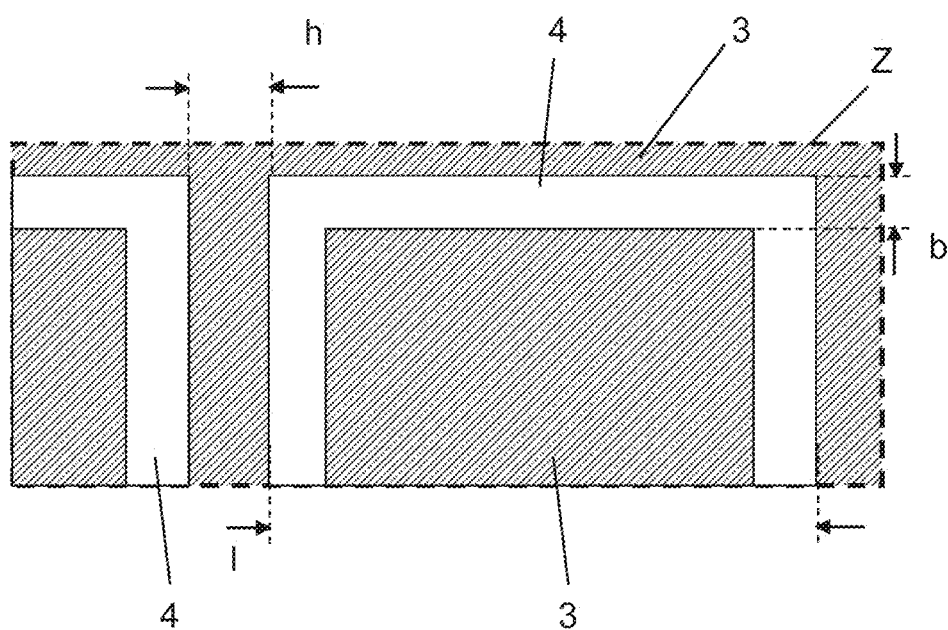
Figure 10:
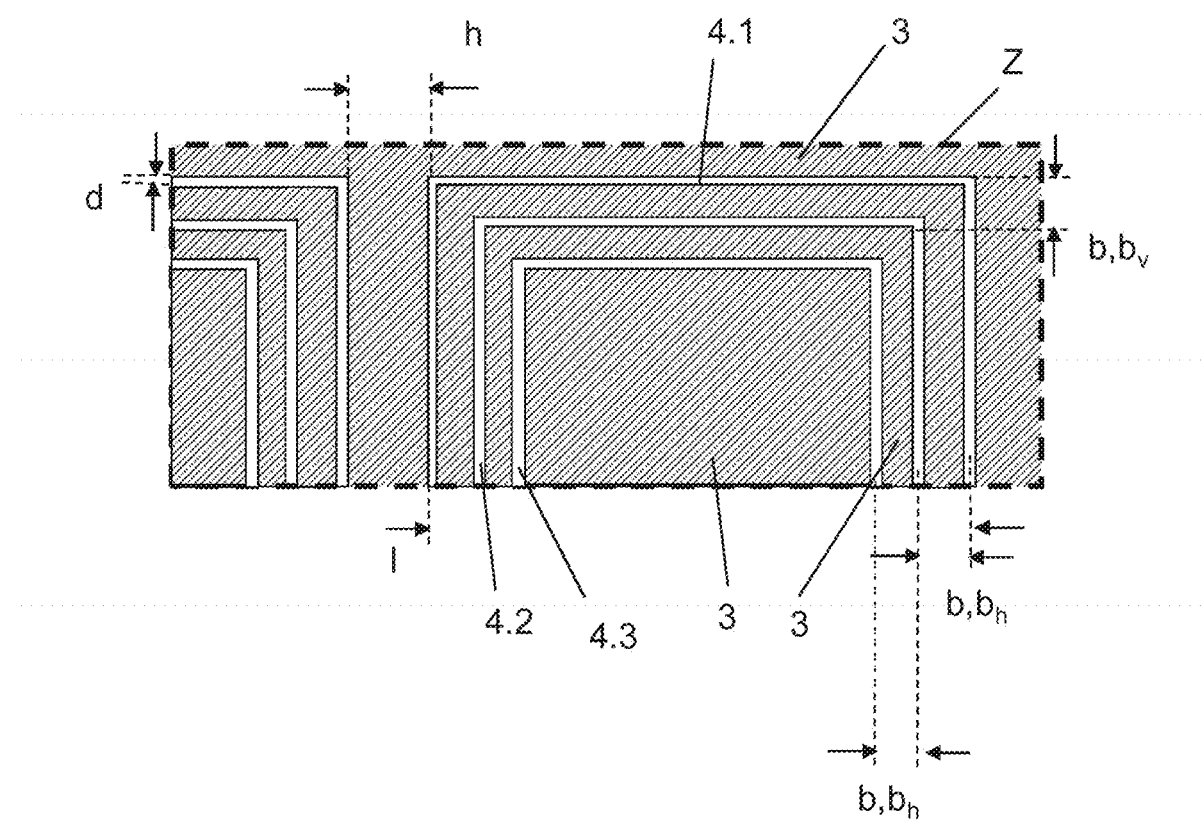
Figure 11:
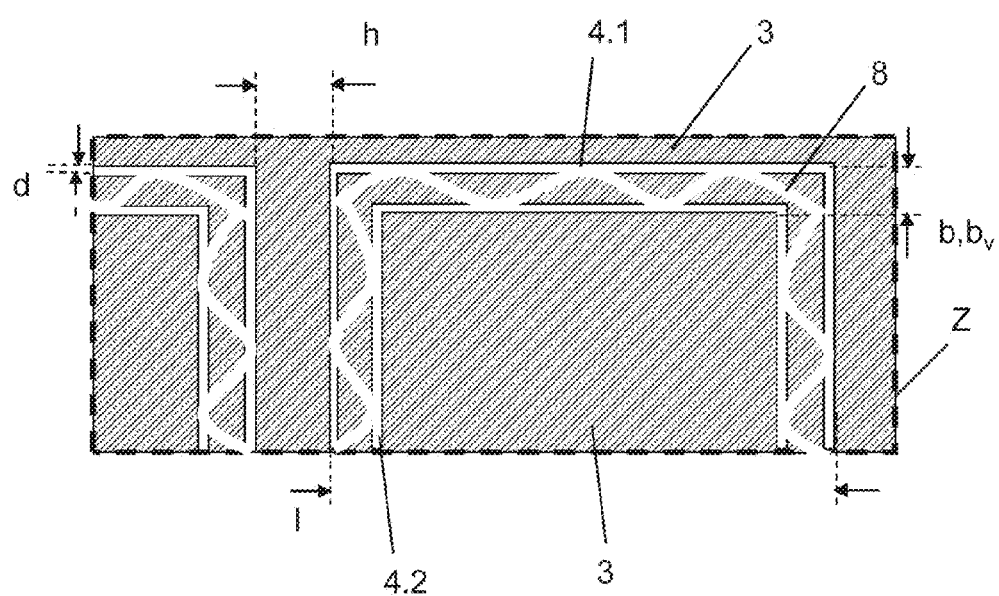
Figure 12A:
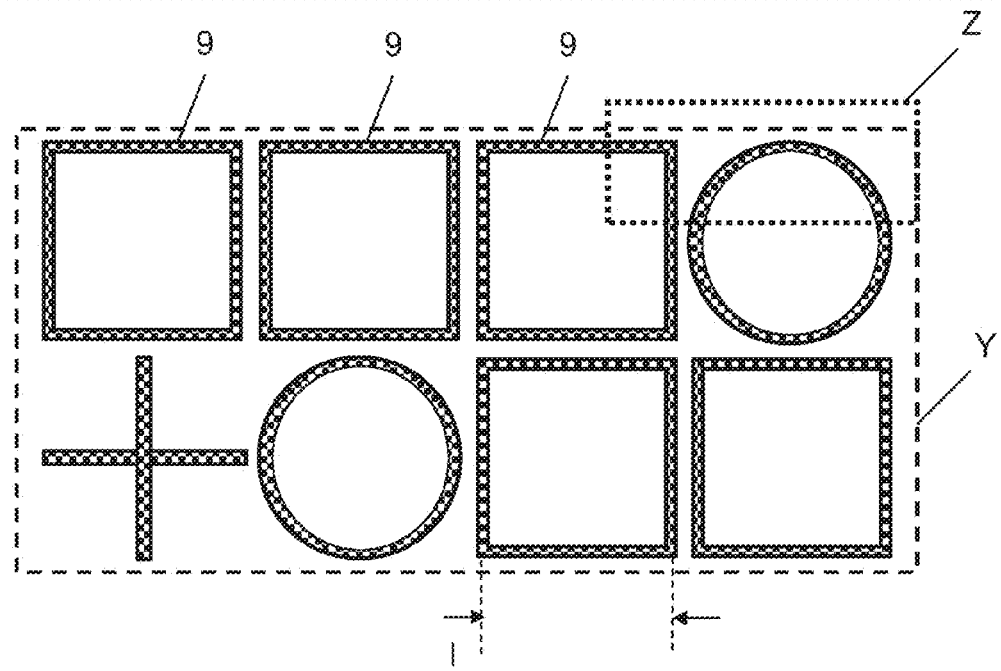
Figure 12B:
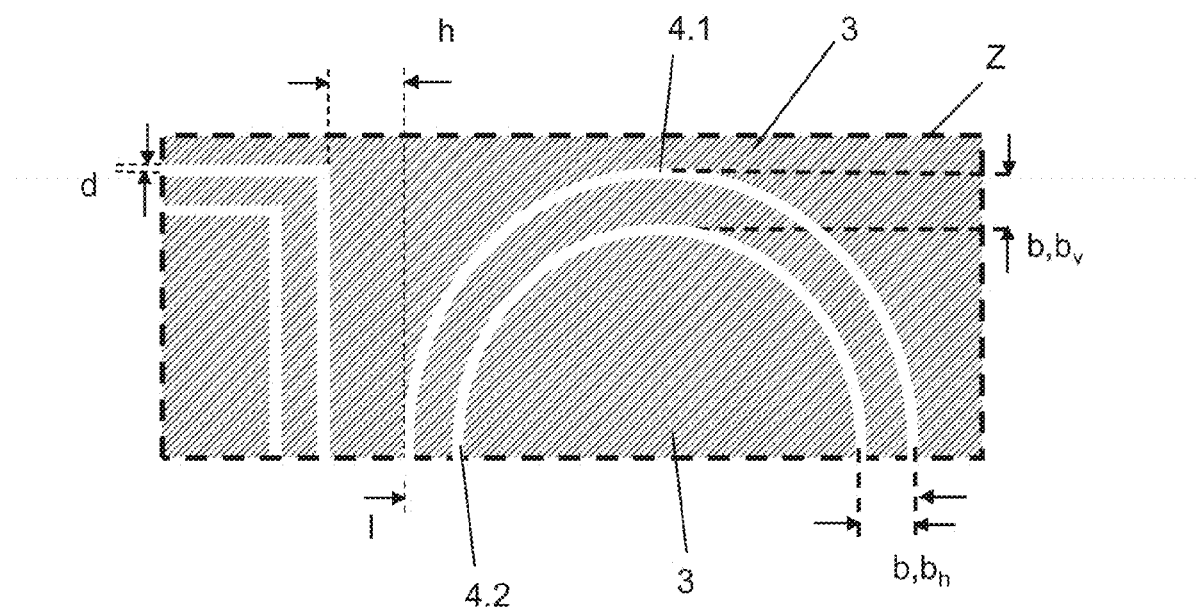
Figure 13:
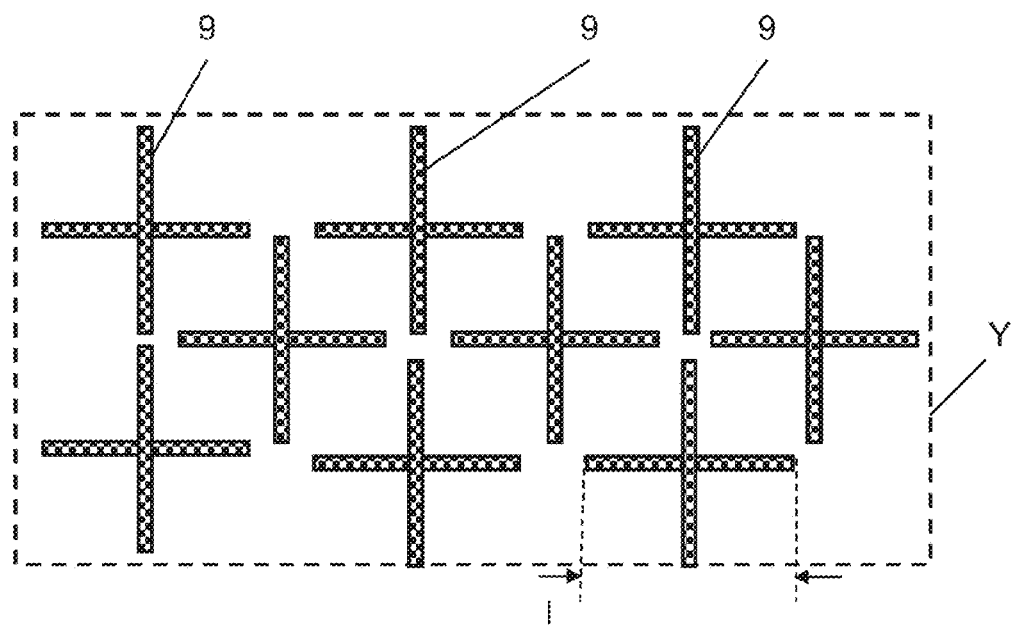
Figure 14:
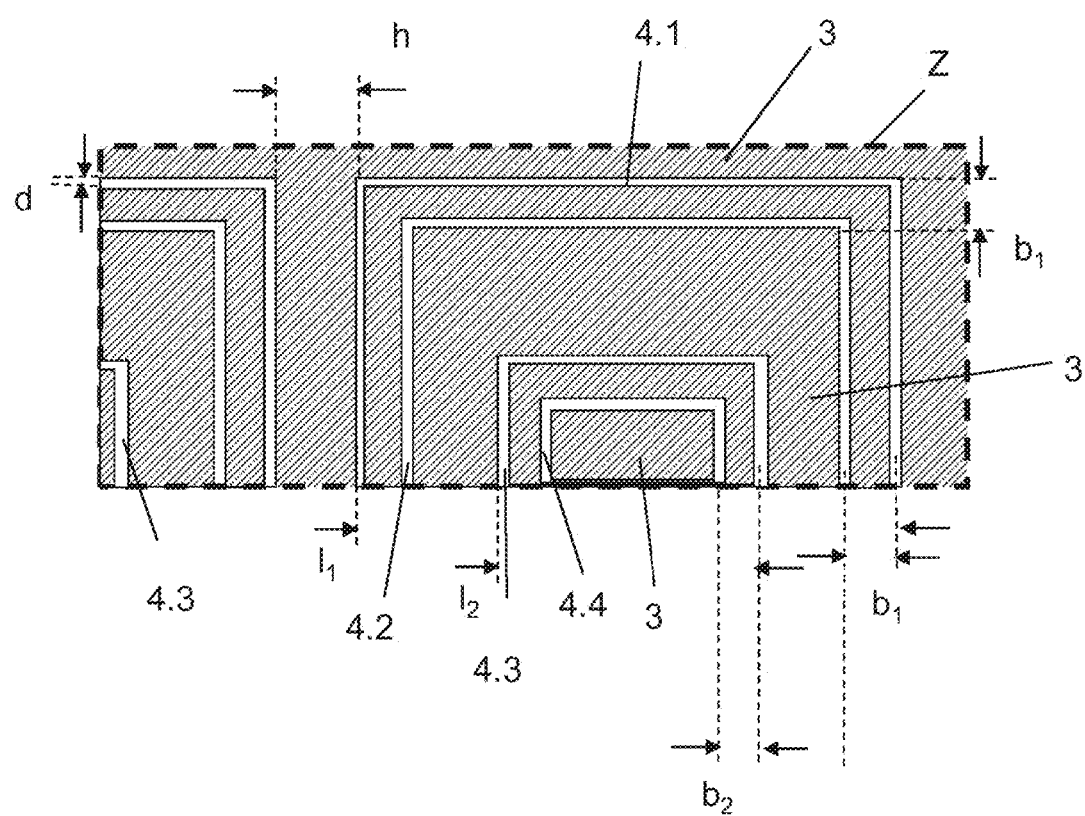
Figure 15:
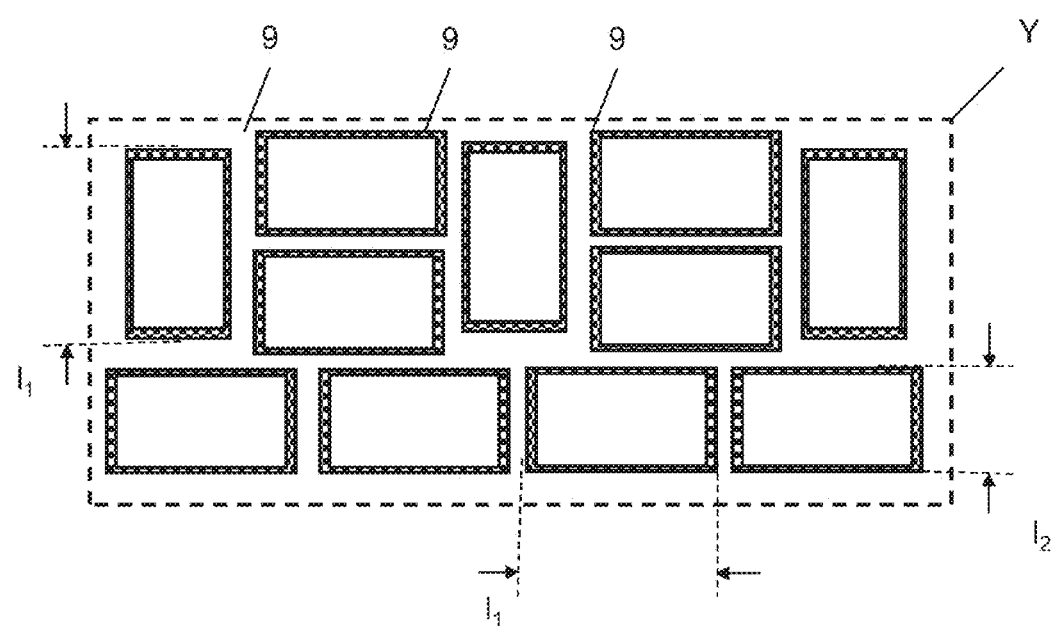
Figure 16A:
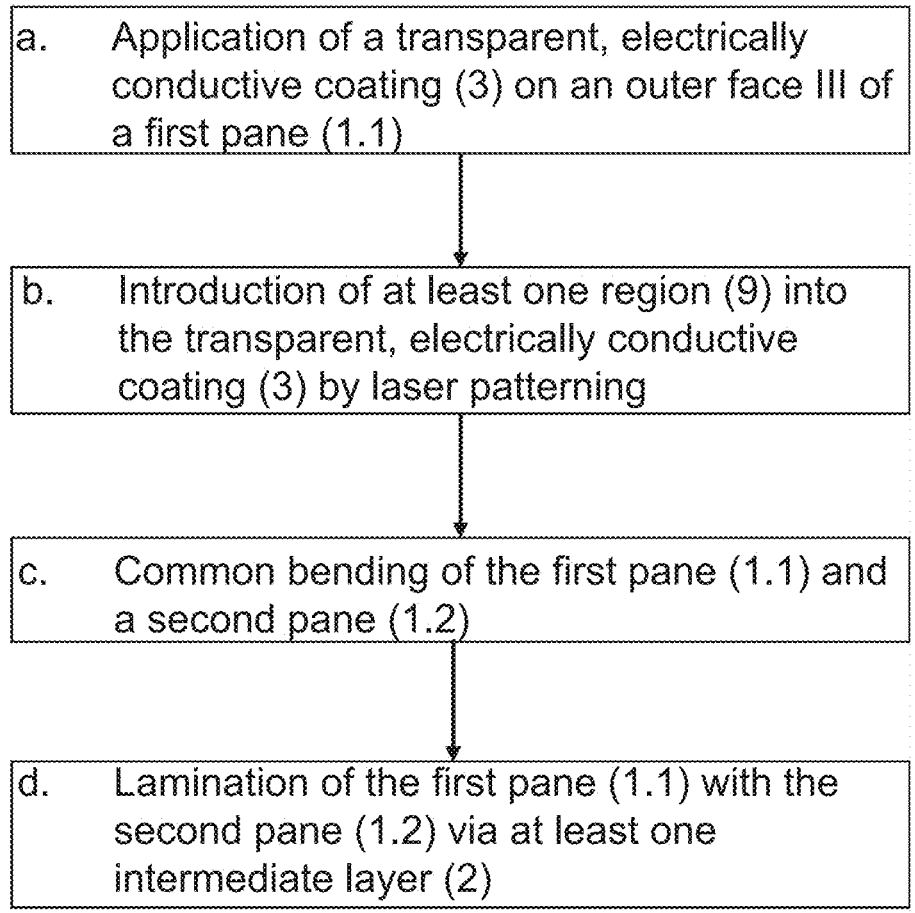
Figure 16B:
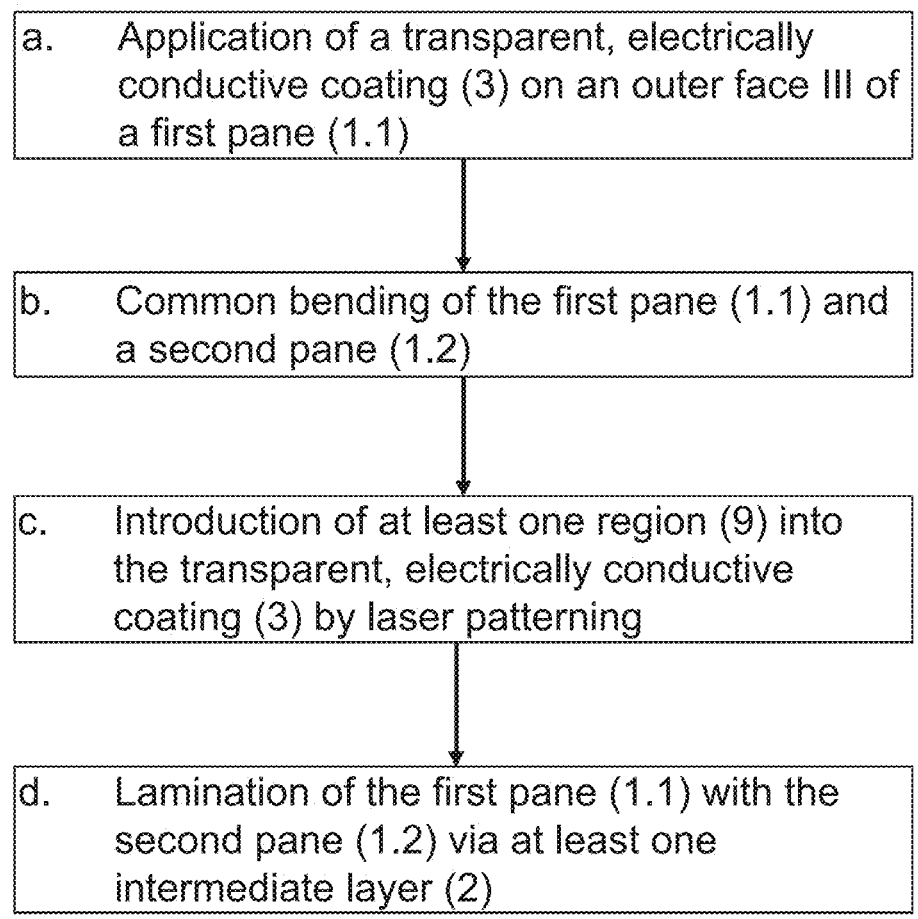
Figure 17:
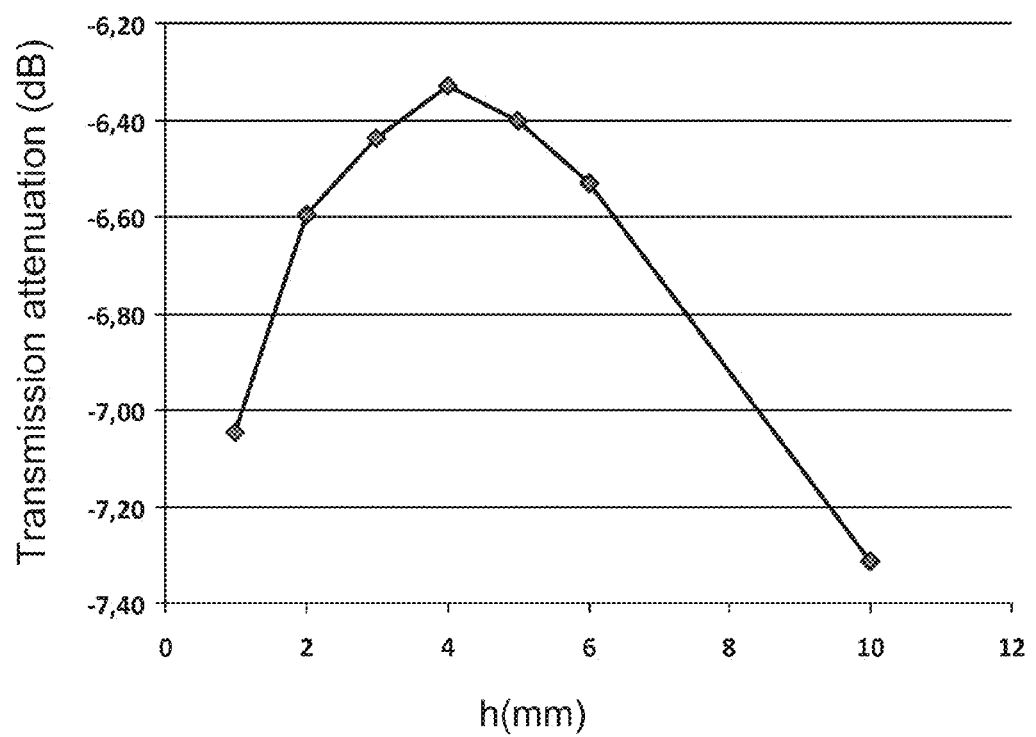
Figure 18:
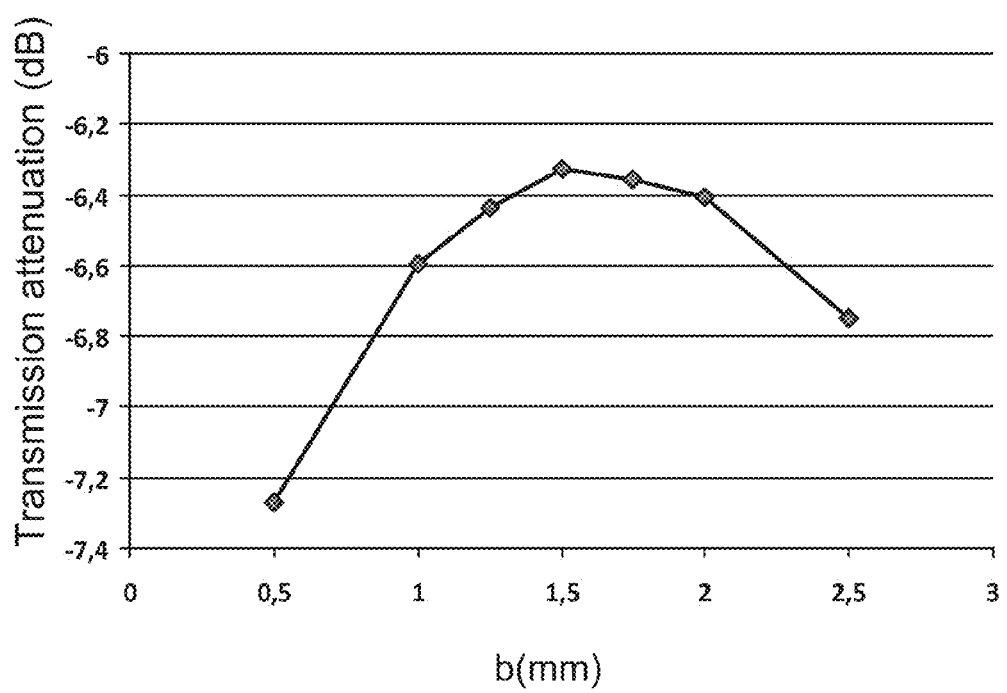
Figure 19:
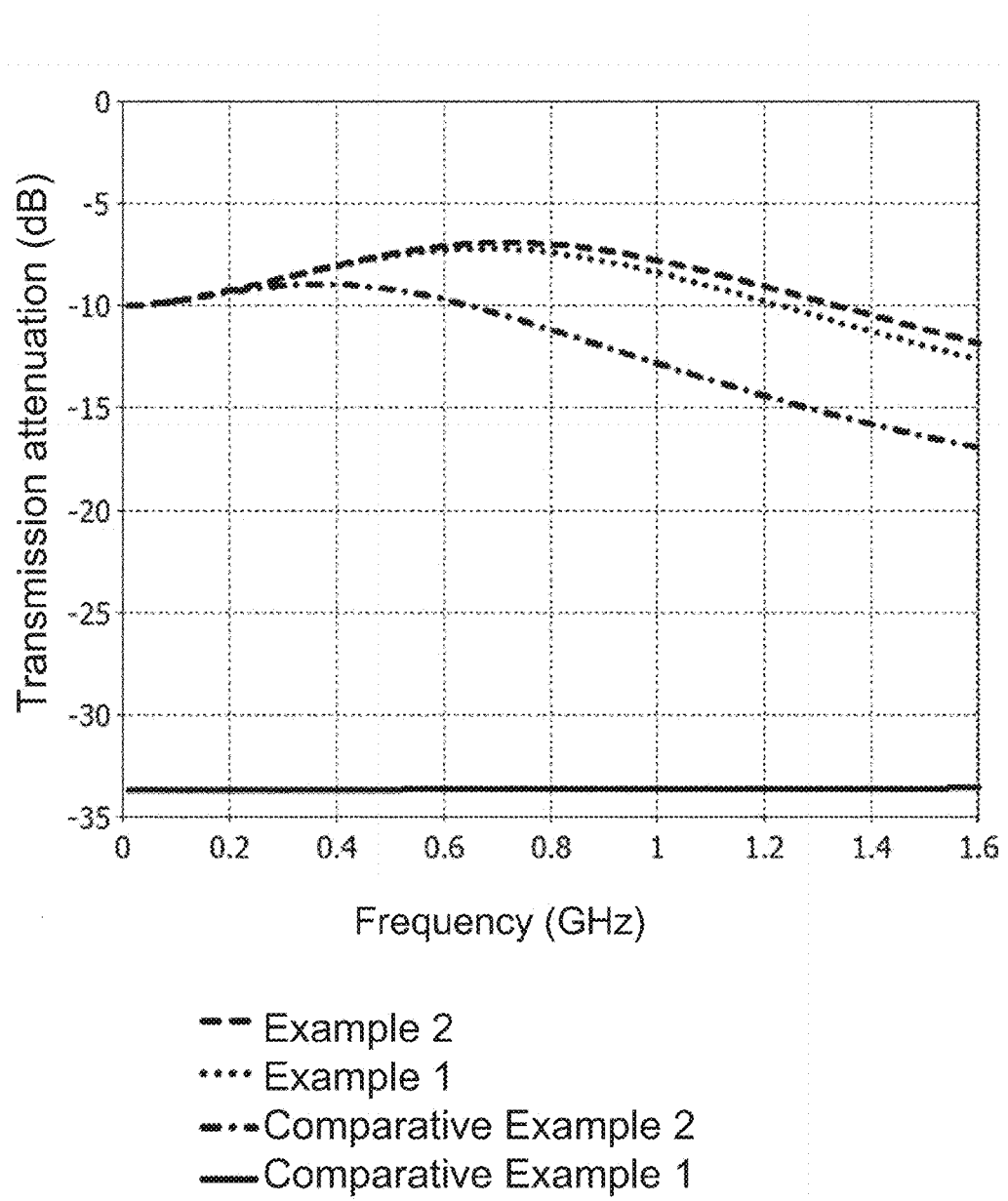
Figure 20:
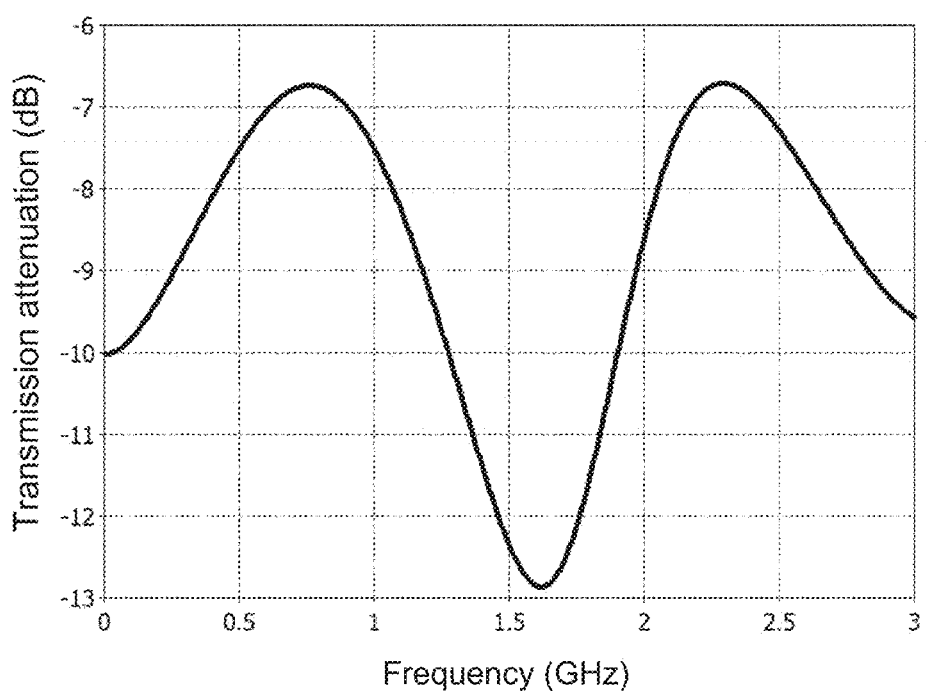
Figure 21:
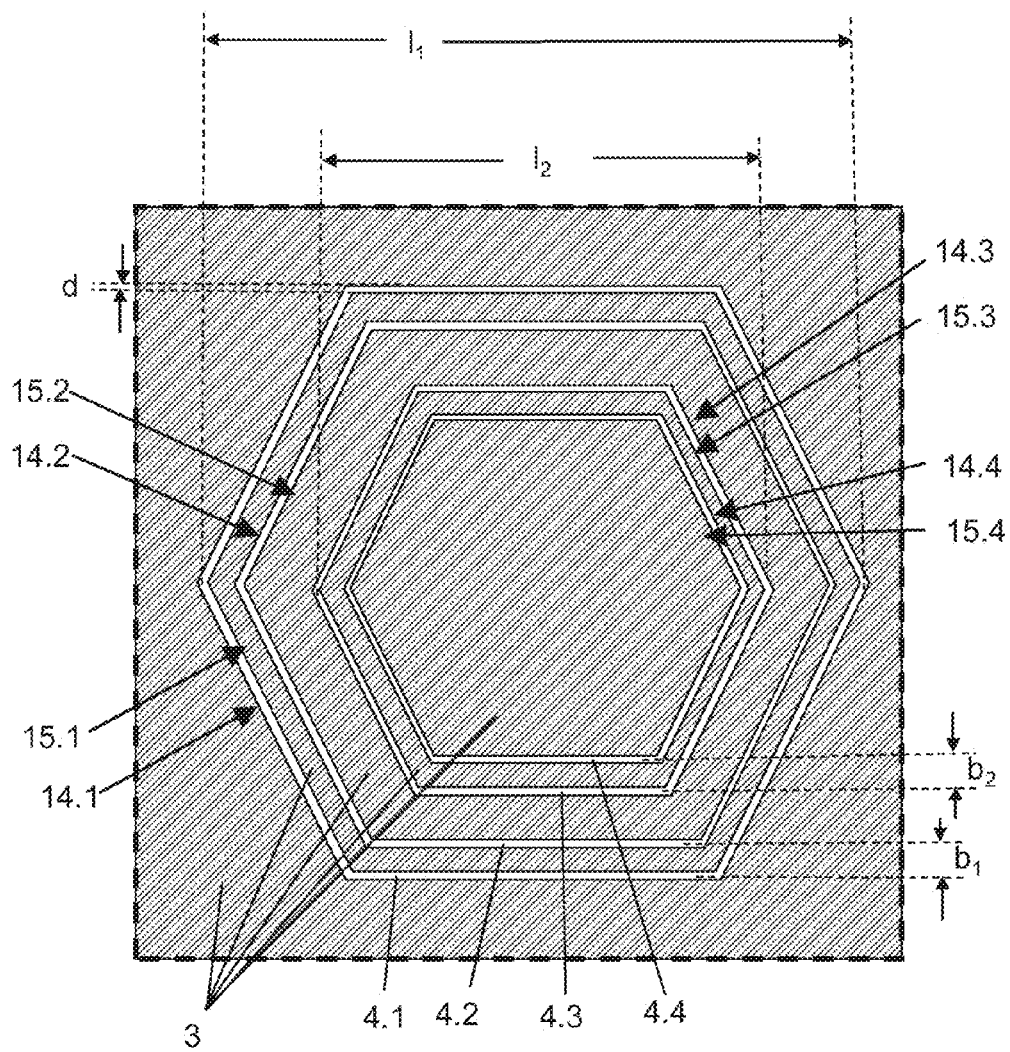
Figure 22:
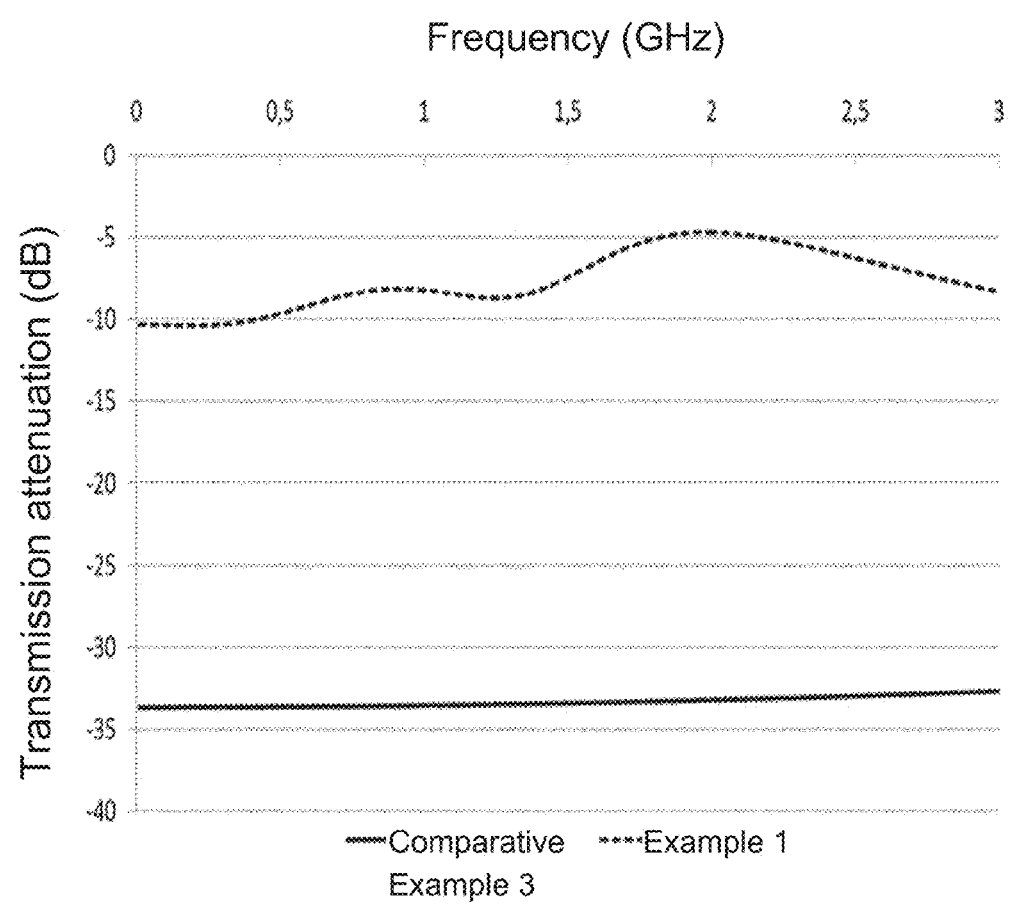

The invention is explained in detail in the following with reference to drawings and an example. The drawings are not completely true to scale. The invention is in no way restricted by the drawings. They depict:

FIG. 1 a schematic representation of a pane according to the invention in plan view,
FIG. 2 a schematic representation einer pane according to the prior art in plan view,
FIG. 3A a schematic representation einer pane according to the invention in plan view,
FIG. 3C an enlarged representation of the detail Y of the pane according to the invention of FIG. 3A,
FIG. 3D an enlarged representation of the detail Z of the pane according to the invention of FIG. 3C,
FIG. 4 a cross-sectional representation along the section line A-A' of FIG. 3A of an alternative exemplary embodiment of a pane according to the invention,
FIG. 5 a cross-sectional representation along the section line A-A' of FIG. 3A of an alternative exemplary embodiment of the pane according to the invention,
FIG. 6 a schematic representation of an alternative exemplary embodiment of a pane according to the invention in plan view,
FIG. 7 an enlarged representation of the detail Z of an alternative exemplary embodiment of a pane according to the invention of FIG. 3C,
FIG. 8 an enlarged representation of the detail Z of an alternative exemplary embodiment of a pane according to the invention of FIG. 3C,
FIG. 9 an enlarged representation of the detail Z of an alternative exemplary embodiment of a pane according to the invention of FIG. 3C,
FIG. 10 an enlarged representation of the detail Z of an alternative exemplary embodiment of a pane according to the invention of FIG. 3C,
FIG. 11 an enlarged representation of the detail Z of an alternative exemplary embodiment of a pane according to the invention of FIG. 3C,
FIG. 12A an enlarged representation of the detail Y of an alternative exemplary embodiment of a pane according to the invention of FIG. 3A,
FIG. 12B an enlarged representation of the detail Z of the pane according to the invention of FIG. 11,
FIG. 13 an enlarged representation of the detail Y of an alternative exemplary embodiment of a pane according to the invention of FIG. 3A,
FIG. 14 an enlarged representation of the detail Z of an alternative exemplary embodiment of a pane according to the invention of FIG. 3A,
FIG. 15 an enlarged representation of the detail Y of an alternative exemplary embodiment of a pane according to the invention of FIG. 3A,
FIG. 16A a flowchart of an exemplary embodiment of the method according to the invention,
FIG. 16B a flowchart of an exemplary embodiment of the method according to the invention,
FIG. 17 a diagram of the transmission attenuation as a function of the distance h between the regions,
FIG. 18 a diagram of the transmission attenuation as a function of the distance b between the outer and inner de-coated structure,
FIG. 19 a diagram of the transmission attenuation for various exemplary embodiments,
FIG. 20 a diagram of the transmission attenuation for an alternative exemplary embodiment of a pane according to the invention,
FIG. 21 a schematic representation of a detail of an alternative exemplary pane according to the invention in plan view, and
FIG. 22 a diagram of the transmission attenuation for the exemplary embodiment of a pane according to the invention in accordance with FIG. 21.

FIG. 1 depicts a schematic representation of a pane according to the invention 10. The pane 10 comprises a first pane 1.1 on whose outer face III a transparent electrically conductive coating 3 is arranged. The transparent, electrically conductive coating 3 has a rectangular region 9. The region 9 is defined by the outer shape of an outer de-coated structure 4.1. Along the outer de-coated structure 4.1, there is no transparent, electrically conductive coating 3 or the transparent, electrically conductive coating 3 has been removed, for example, by laser patterning. A likewise rectangular inner de-coated structure 4.2 is arranged inside the outer de-coated structure 4.1. Along the inner de-coated structure 4.2, there is no transparent, electrically conductive coating 3 or the transparent, electrically conductive coating 3 has been removed, for example, by laser patterning. The outer de-coated structure 4.1 is completely surrounded by the transparent, electrically conductive coating 3. Furthermore, a part of the transparent, electrically conductive coating 3 is arranged between the outer de-coated structure 4.1 and the inner de-coated structure 4.2 as well as inside the inner de-coated structure 4.2. In the present example, the intermediate region between the outer de-coated structure 4.1 and the inner de-coated structure 4.2 as well as the inner region of the inner de-coated structure 4.2 are completely filled with the transparent, electrically conductive coating 3. By means of the outer de-coated structure 4.1 and the inner de-coated structure 4.2, the transparent, electrically conductive coating 3, otherwise impermeable for high-frequency electromagnetic radiation becomes permeable. The de-coated structures 4.1, 4.2 are, for example, de-coated by laser patterning and have only a very small line width of, for example, 0.1 mm. The view through the pane according to the invention 10 is not significantly impaired and the de-coated structures 4.1, 4.2 are hardly discernible.

FIG. 2 depicts a schematic representation of a pane 12 according to the prior art. The pane 12 comprises, like the pane 10 of FIG. 1, a first pane 1.1 on whose outer face III a transparent, elektromagnetische coating 3 is arranged. In order to make the pane 12 permeable for high-frequency electromagnetic radiation, the transparent, electromagnetic coating 3 has a rectangular de-coated region 4. In contrast to the pane according to the invention 10 of FIG. 1, the area of the de-coated region 4 is very large and the de-coating is clearly discernible on the pane 12. Vision through such a pane 12 is impaired and the pane is, for example, not suitable as a pane in a vehicle.

FIG. 3A depicts a schematic representation of a pane 10 according to the invention using the example of a vehicle windshield in plan view. FIG. 3B depicts a cross-sectional representation along the section line A-A' of FIG. 3A using the example of a composite pane. FIG. 3C depicts an enlarged detail Y of FIG. 3A; and FIG. 3D, an enlarged detail Z of FIG. 3C. The pane 10 is, without restricting the invention, optimized for the transmission of mobile phone radiation in the GSM 900 band. The pane 10 comprises a composite pane 1 made of two individual panes, namely, a rigid first pane 1.1 and a rigid second pane 1.2, which are fixedly bonded to each other via a thermoplastic intermediate layer 2. The individual panes 1.1,1.2 have roughly the same size and are manufactured, for example, of glass, in particular float glass, cast glass, and ceramic glass, being equally possibly produced from a nonglass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with adequate transparency, sufficient chemical resistance, as well as suitable shape and size stability can be used. For another type of use, for example, as a decorative part, it would also be possible to produce the first pane 1.1 and the second pane 1.2 from a flexible and/or a non-transparent material. The respective thickness of the first pane 1.1 and of the second pane 1.2 can vary widely depending on the use and can be, in the case of glass, for example, in the range from 1 to 24 mm. In the present example, the first pane 1.1 has a thickness of 2.1 mm; and the second pane 1.2, a thickness of 1.8 mm.

The pane faces are identified with the Roman numerals I-IV, where face I corresponds to the outer face of the second pane 1.2, face II to the inner face of the second pane 1.1, face III to the outer face of the first pane 1.1, and face IV to the inner face of the first pane 1.1 of the composite pane 1. In the context of the present invention, "outer face" is the face of a pane that faces the exterior of the vehicle. "Inner face" is the face of a pane that faces the interior of the vehicle. In the use as a windshield, the face I faces the external environment and the face IV faces the passenger compartment of the motor vehicle. Needless to say, the face IV can also face outward and the face I can face the passenger compartment of the motor vehicle.

The intermediate layer 2 for the bonding of the first pane 1.1 and the second pane 1.2 preferably contains an adhesive plastic preferably based on polyvinyl butyral (PVB), ethylene vinyl acetate (EVA), or polyurethane (PU).

The composite pane 1 is transparent to visible light, for example, in the wavelength range from 350 nm to 800 nm, with the term "transparency" understood to mean light permeability of more than 50%, preferably more than 70%, and in particular preferably more than 75%.

The relative permittivity of the panes 1.1,1.2 of the composite pane 1 is, for panes made of float glass, from 6 to 8 and, for example, 7.

In the example presented, the transparent, electrically conductive coating 3 is applied on the face III of the inner first pane 1.1 facing the intermediate layer 2. The transparent, electrically conductive coating 3 serves, for example, as an infrared reflecting layer of the composite pane 1. This means that the fraction of thermal radiation of incident sunlight is largely reflected. With the use of the composite pane 1 in a vehicle, this provides for reduced heating of the interior in sunlight. The transparent, electrically conductive coating 3 is known, for example, from EP 0 847 965 B1 and includes two silver layers that are embedded in each case between a plurality of metal and metal oxide layers. The transparent, electrically conductive coating 3 has a sheet resistance of roughly 4 ohm/square. The transparent, electrically conductive coating 3 can also serve as an electrically heatable coating and can be contacted by means of bus bars known per se and can be connected to a voltage source.

The transparent, electrically conductive coating 3 can, however, be arranged on the face II of the outer, second pane 1.2 facing the thermoplastic intermediate layer 2, or on the two interior pane faces II and III. The transparent, electrically conductive coating 3 can be arranged additionally or exclusively on one of the outer faces I and IV of the composite pane 1.

The transparent, electrically conductive coating 3 is applied on the entire first pane 1.1, minus an edge-de-coated region 5. The edge de-coating in the region 5 prevents a contact of the transparent, electrically conductive coating 3, which is advantageous with corrosion-sensitive coatings. Moreover, the second pane 1.2 is provided, for example, with an opaque ink layer that is applied on the face II and forms a frame-like peripheral masking strip, which is not shown in detail in the figures. The ink layer consists, preferably, of an electrically nonconductive black-colored material, which can be fired into the first pane 1.1 or the second pane 1.2. The masking strip prevents, on the one hand, seeing an adhesive strand with which the composite pane 1 is glued into the vehicle body; on the other, it serves as UV protection for the adhesive material used.

Furthermore, the transparent, electrically conductive coating 3 is partially de-coated in a plurality of regions 9. In the example presented of FIG. 3A, in each case, two rows of 12 regions 9 each are arranged almost vertically one over the other. The 24 regions 9 are arranged horizontally next to each other in a section 11 on the top edge of the pane 1. The terms "vertical" and "horizontal" indicate the position in the installed position of the motor vehicle window pane. The 24 regions 9 are arranged on the top pane edge of the longer side of the pane 1 and outside the A-field of view 7 of the driver in accordance with Annex 18 of the ECE R43.

Two rows of 12 regions 9 each arranged vertically one above the other with de-coated structures 4.1, 4.2 are arranged on the upper edge of the pane 10. The area of the 24 regions 9 covers roughly 7% of the entire area of the composite pane 1. This area fraction yields a particularly favorable relationship between process costs, visual aspect, and transmission. The horizontal and vertical distance h between the two regions 9 is, for example, 2 mm.

FIG. 3C depicts an enlarged detail Y of FIG. 3A with eight regions 9, and FIG. 3D depicts an enlarged detail Z of FIG. 3C. Each region 9 includes an outer de-coated structure 4.1 and an inner de-coated structure 4.2 with a square shape. The upper and lower sides of the quadratic shape are arranged horizontal to the installation direction. This horizontal orientation is particularly advantageous for reception of vertically transmitted mobile telephony. The invention also includes de-coated structures 4.1,4.2 arranged at different angles if this is expedient.

The line width d of the de-coating of the de-coated structures 4.1,4.2 is constant and is, for example, 100 μm. Such small line widths are hardly perceptible visually to the eye and do not impair vision through the pane 10 such that the pane 10 is suitable for use as a windshield of a vehicle.

The distance b from the outer de-coated structure 4.1 to the inner de-coated structure 4.2 is, for example, 1 mm both in the vertical direction ($b_v$) and in the horizontal direction ($b_h$). Needless to say, the distances $b_v$ and $b_h$ need not be equal. The outer de-coated structure 4.1 determines the dimensions of the region 9 and in particular the length l of the region. In the example presented, the outer de-coated structure 4.1 has a length l of, for example, 42 mm. The distance b affects, in particular, the bandwidth and the level of the transmission permeability for high-frequency electromagnetic radiation.

The length l is tuned to the high-frequency electromagnetic radiation with frequency f, for which the pane 10 is intended to be maximally permeable. The length l depends, for de-coated structures with a square shape, in a first approximation using the equation $l=c/(4*f*(\in_{eff})^{0.5})$, on the effective relative permittivity $\in_{eff}$ of the pane 1.1,1.2 and of the intermediate layer 2, where c is the speed of light. Due to adjacently arranged regions 9 with de-coated structures 4.1,4.2, there can be influencing of the regions 9 among each other and thus the formation of resonances and frequency shifts that necessitate adaptation and optimization of the length l, of the width b, of the vertical distance d, and of the horizontal distance h. These can be calculated using simulations familiar to the person skilled in the art.

The pane 10 of FIG. 3A was optimized for the operation of the mobile telephony band GSM 900. By variation of the parameters, such as the length l of the de-coated regions, the pane 10 can, in a simple manner, be optimized for the transmission of other frequency bands for a plurality of frequency bands.

FIG. 4 depicts a cross-sectional representation along the section line A-A' of FIG. 3A of an exemplary embodiment of a pane according to the invention 10 with a composite pane 1. In this exemplary embodiment, the first pane 1.1 and the second pane 1.2 are bonded to a three-ply intermediate layer. The three-layer intermediate layer includes a film 6, which contains, for example, polyethylene terephthalate (PET), and which is arranged between two layers 2 of an adhesive plastic, for example, polyvinyl butyral (PVB). The PET film is implemented here, for example, as a carrier of the transparent, electrically conductive coating 3.

FIG. 5 depicts a cross-sectional representation along the section line A-A' of FIG. 3A of an exemplary embodiment of a pane according to the invention 10 mit a single pane 1'. The transparent, electrically conductive coating 3 with the regions 9 with de-coated structures 4.1,4.2 is arranged on the inner face IV of the single plane 1' facing the vehicle interior. The shape and material of the single pane 1' correspond to the first pane 1.1 of FIG. 3A. The transparent, electrically conductive coating 3 and the regions 9 also correspond to the exemplary embodiment of FIG. 3A. The transparent, electrically conductive coating 3 here is, for example, a so-called low-E layer and has low emissivity for infrared radiation. The transparent, electrically conductive coating 3 contains or is made of, for example, an indium tin oxide (ITO) layer with a sheet resistance of 20 ohm/square. The indium tin oxide layer is implemented inert relative to environmental influences and scratch resistant such that the indium tin oxide layer can be arranged on the surface of a side window of a motor vehicle facing a vehicle interior.

Alternatively, a scratch and corrosion-sensitive or an electrically live heatable transparent, electrically conductive coating 3 can be protected by an insulating layer that contains, for example, a polymer film, such as polyethylene terephthalate (PET) or polyvinyl fluoride (PVF). Alternatively, the transparent, electrically conductive coating 3 can have an insulating and scratch resistant cover layer made of inorganic oxides, such as silicon oxide, titanium oxide, tantalum pentoxide, or combinations thereof.

FIG. 6 depicts a schematic representation of an alternative exemplary embodiment of a pane according to the invention 10 in plan view. In contrast to FIG. 3A, further regions 9 are arranged on the side edges and on the lower edge of the pane 10. By means of the further regions 9, the permeability for electromagnetic radiation according to the invention inside the motor vehicle interior can be increased. An improvement of the permeability can be obtained in particular on the lower edge of the pane 10 and thus the reception and transmission power of sensors, for example, GPS sensors that are installed in the instrument panel can be improved. An arrangement 13 of, for example, nine regions 9 arranged horizontally and vertically to each other is arranged on the lower edge of the pane. The arrangement 13 has an angle α of, for example, 45° relative to the lower edge of the pane 10 and thus to the horizontal in the installed position of the pane 10. The arrangement 13 of the regions 9 in a horizontal and vertical position relative to each other results in particularly high transmission through this region of the pane 10.

FIG. 7 depicts an enlarged representation of the detail Z of an alternative exemplary embodiment of a pane according to the invention of FIG. 3D. In contrast to FIG. 3D, the outer structure 4.1 and the inner structure 4.2 are connected by four de-coated lines 8 per side. The de-coated lines 8 are arranged orthogonal to the side lines of the outer structure 4.1 and of the inner structure 4.2. The de-coated lines 8 have, for example, a line width d of 0.1 mm, which corresponds to the line width d of the de-coated structures 4.1,4.2. The distance between the lines 8 should be less than one fourth the wavelength of the high-frequency electromagnetic radiation and preferably from $\lambda/20$ to $\lambda/500$ such that few disruptive field-induced currents can be formed between the outer de-coated structure 4.1 and the inner de-coated structure 4.2. By means of the de-coated lines 8, the transmission attenuation of the high-frequency electromagnetic radiation is clearly reduced and, at the same time, the outlay for the laser processing of the transparent, electrically conductive coating 3 is only slightly increased.

FIG. 8 depicts an enlarged representation of the detail Z of an alternative exemplary embodiment of a pane 10 according to the invention of FIG. 3D. In contrast to FIG. 5, the outer structure 4.1 and the inner structure 4.2 are connected via nine de-coated lines 8 per side. Thus, the transmission properties are further improved compared to a pane 10 in accordance with FIG. 7, in other words, in particular, the transmission attenuation decreases.

FIG. 9 depicts an enlarged representation of the detail Z of an alternative exemplary embodiment of a pane 10 according to the invention of FIG. 3D. In contrast to FIG. 8, the complete region 4 between the outer structure 4.1 and the inner structure 4.2 is de-coated over a width b of 1 mm. This exemplary embodiment has low transmission attenuation. However, since the de-coated region 4 with a width b of 1 mm is very wide, the de-coating is visually very conspicuous and degrades the vision through the pane 10. At the same time, the infrared reflecting action is reduced and the processing cost of the laser patterning is significantly increased.

FIG. 10 depicts an enlarged representation of the detail Z of an alternative exemplary embodiment of a pane 10 according to the invention of FIG. 3D. In contrast to FIG. 3D, another de-coated structure 4.3 is arranged inside the inner de-coated structure 4.2. For example and without limiting the invention thereto, the distance b between the inner de-coated structure and the other de-coated structure 4.3 is equal to the distance b between the outer de-coated structure 4.1 and the inner de-coated structure 4.2.

FIG. 11 depicts an enlarged representation of the detail Z of an alternative exemplary embodiment of a pane 10 according to the invention of FIG. 3D. In contrast to FIG. 3D, the outer structure 4.1 and the inner structure 4.2 are connected by a curved and, for example, in particular a sinusoid de-coated line. Such a pane 10 has good transmission properties similar to those of the pane 10 of FIG. 8. Moreover, it has advantages in the de-coating using laser processing. Because of the curved course of the lines, the mirror mechanics have to execute less large changes per time interval than with the patterning of the orthogonally running de-coated structures 8 of FIG. 8. The forces acting on the mirror mechanics are lower and the laser positioning can be executed more quickly. The patterning time is thus significantly reduced.

FIG. 12A depicts an enlarged representation of the detail Y of an alternative exemplary embodiment of a pane according to the invention 10 of FIG. 3A and FIG. 12B depicts an enlarged representation of the detail Z of the pane 10 according to the invention of FIG. 12A. In this exemplary embodiment, the regions 9 have different shapes and, for example, the shape of a circle, of a square, and of a cross. This has the particular advantage that the permeability for different frequencies and polarizations for high-frequency electromagnetic radiation can be optimized and increased. For this, one pane 10 according to the invention can, for example, have a large number of regions 9 with de-coated structures of various shapes and dimensions.

FIG. 13 depicts an enlarged representation of the detail Y of an alternative exemplary embodiment of a pane 10 according to the invention of FIG. 3A. The transparent, electrically conductive coating 3 has multiple regions 9 with cross-shaped de-coated structures 4.1,4.2.

FIG. 14 depicts an enlarged representation of the detail Z of an alternative exemplary embodiment of a pane 10 according to the invention of FIG. 3A. Another outer de-coated structure 4.3 is arranged inside the inner de-coated structure 4.2 and another inner de-coated structure 4.4 is arranged inside the other outer de-coated structure 4.3. The other de-coated structures 4.3,4.4 also have, for example, a square shape and are arranged one over another and concentrically relative to the de-coated structures 4.1,4.2. Needless to say, the other de-coated structures 4.3,4.4 can also have other shapes or their center can be arranged offset. The distance $b_1$ between the outer de-coated structure 4.1 and the inner de-coated structure 4.2 is, for example, 1 mm. The distance $b_2$ between the outer de-coated structure 4.3 and the inner de-coated structure 4.4 is also, for example, 1 mm. Needless to say, the distances $b_1$ and $b_2$ need not be the same. The length of the outer de-coated structure 4.1 is, for example, 36 mm and the length $l_2$ of the other de-coated structure 4.3 is, for example, 24 mm. Such a pane 10 according to the invention can have improved transmission for multiple frequency ranges, and, in this case, for two frequency ranges.

FIG. 15 depicts an enlarged representation of the detail Y of an alternative exemplary embodiment of a pane 10 according to the invention of FIG. 3A. The transparent, electrically conductive coating 3 has multiple regions 9 with rectangular de-coated structures 4.1,4.2. The rectangular outer de-coated structure 4.1 has a longer side length of 36 mm and a shorter side length $l_2$ of 24 mm. This is particularly advantageous in order to avoid the possible interference of different regions 9 in nested embodiments, as is depicted in FIG. 15, and to obtain improved multiband transmission.

FIG. 16A depicts a flowchart of an exemplary embodiment of the method according to the invention for producing a pane 10 according to the invention. FIG. 16B depicts a flowchart of another variant of an exemplary embodiment of the method according to the invention for producing a pane 10 according to the invention. In contrast to FIG. 16A, in FIG. 16B, the first pane 1.1 and the second pane 1.2 are bent first and, subsequently, the outer de-coated structures 4.1 and the inner de-coated structures 4.2 are introduced.

FIGS. 17 to 20 depict simulations of the transmission attenuation for different exemplary embodiments of panes 10 according to the invention. In the simulations, analogously to the exemplary embodiment in FIG. 5, a single glass pane 1' with a transparent electrically conductive coating 3 on the inner face IV of the single glass pane 1' is assumed. The transparent, electrically conductive coating 3 has a sheet resistance of 4 ohm/square. Regions 9 with de-coated structures 4.1,4.2 are arranged inside the transparent, electrically conductive coating 3. To simplify the simulation, an infinitely extended single glass pane 1' with infinitely many regions 9 was assumed.

FIG. 17 depicts a diagram of the transmission attenuation as a function of the distance distance h between two adjacent regions 9. The regions 9 contain in each case an outer de-coated structure 4.1 and an inner de-coated structure 4.2 with a square shape, as is depicted in FIG. 3D. The distance b of the outer de-coated structure 4.1 from the inner de-coated structure 4.2 was 1.5 mm. The length l of the outer de-coated structure 4.1 was adapted to high-frequency electromagnetic radiation with a frequency of 1.5 GHz (GPS) and was 24 mm. The line width d of the de-coated structures was 0.1 mm. The diagram in FIG. 17 depicts the transmission attenuation in dB as a function of the distances h between two adjacent regions 9. The signal curve shows a minimal transmission attenuation at a distance h of 4 mm. Here, the transmission attenuation is only roughly 6.3 dB compared to a single glass pane 1' without transparent, electrically conductive coating 3. For distances h of less than 2 mm and more than 6 mm, the transmission attenuation increases sharply. For the frequency of 1.5 GHz used here, a distance b of 1.5 mm and a line width d of 0.1 mm yields a preferred region with high transmission for distances h of 2 mm to 6 mm.

FIG. 18 depicts a diagram of the transmission attenuation as a function of the distance distance b between the outer de-coated structure 4.1 and the inner de-coated structure 4.2. The other parameters correspond to those of FIG. 17. The distance h between adjacent regions 9 was 4 mm. The length l of the outer de-coated structure 4.1 was 24 mm. The line width d of the de-coated structures was 0.1 mm. The diagram in FIG. 18 depicts the transmission attenuation in dB as a function of the distance b. The signal curve depicts a minimal transmission attenuation at a distance b of 1.5 mm. Here, the transmission attenuation is only roughly 6.3 dB compared to a single glass pane 1' without transparent, electrically conductive coating 3. For distances b of less than 1 mm and more than 2 mm, the transmission attenuation increases sharply. For the frequency of 1.5 GHz used here, a distance h of 4 mm and a line width d of 0.1 mm yield a preferred region with high transmission for distances b of 1 mm to 2.25 mm.

FIG. 19 depicts a diagram of the transmission attenuation for various exemplary embodiments of regions 9 according to the invention with de-coated structures 4.1,4.2 as a function of frequency. The distance h between adjacent regions 9 was 2 mm, the distance b from the outer de-coated structure 4.1 to the inner de-coated structure 4.2 was 1 mm, and the line width d of the de-coated structures 4.1,4.2 was 0.1 mm. The other parameters of the single glass pane 1' and the sheet resistance of the transparent, electrically conductive coating 3 correspond to those of FIG. 17.

As Example 1, the transmission attenuation is plotted for a region 9 according to the exemplary embodiment of FIG. 3D. The length l of the outer de-coated structure 4.1 is adapted to the mobile telephony band GSM 900 and is 42 mm. The transmission attenuation for high-frequency, electromagnetic radiation of 900 MHz is roughly 7.8 dB. Mobile telephony reception behind the pane is possible. Due to the small line width d of 0.1 mm, the regions 9 with the de-coated structures 4.1,4.2 are hardly visible and do not interfere with vision through the pane.

As Example 2, the transmission attenuation is plotted for a region 9 according to the exemplary embodiment of FIG. 8. The outer de-coated structure 4.1 and the inner de-coated structure 4.2 are connected on each side of the square shape by 41 de-coated lines 8. The distance between two de-coated lines 8 along one side of the de-coated structures 4.1,4.2 is roughly 1 mm and thus roughly 1/333-th of the wavelength λ of the high-frequency, electromagnetic radiation with a frequency of 900 MHz. The de-coated lines 8 run orthogonal to the de-coated structures 4.1,4.2. Each de-coated line 8 has, in the simulation reported, a line width of 0.1 mm. The transmission attenuation for high-frequency, electromagnetic radiation of 900 MHz is roughly 7.3 dB. In other words, the transmission for high-frequency, electromagnetic radiation is improved compared to the pane 10 of Example 1. Mobile telephony reception behind the pane is possible and improved compared to Example 1. Due to the small line width of the de-coated lines 8 of 0.1 mm, the regions 9 are hardly visible and do not interfere with vision through the pane.

FIG. 19 presents, as Comparative Example 1, the transmission attenuation for a single glass pane 1' with a transparent, electrically conductive coating 3 without regions 9 with de-coated structures 4.1,4.2. The transmission attenuation is, at roughly 34 dB, very high such that, for example, no mobile telephony reception is possible behind this pane.

As Comparative Example 2 according to the prior art, the transmission attenuation is plotted for a single glass pane 1' with a transparent, electrically conductive coating 3 that has only one square de-coated structure 4 with a line width d of 0.1 mm. In other words, the pane 10 according to Comparative Example 2 has no inner de-coated structure 4.2 or other de-coatings outside or inside the de-coated structure 4. The transmission attenuation is roughly 12 dB at a frequency of 900 MHz. Mobile telephony reception is impossible or possible only to a very limited extent behind the single glass pane 1' of Comparative Example 2.

The transmission attenuation of the Example 2 of FIG. 8 is, at a frequency of 900 MHz, lower by 4.7 dB than with the Comparative Example 2 according to the prior art. This means that it was possible to reduce the transmission attenuation by a factor of 3, without the vision through the pane 10 and its optical properties being appreciably degraded.

FIG. 20 depicts a diagram of the transmission attenuation for a pane 10 according to the invention in accordance with FIG. 5 with regions 9 in accordance with FIG. 14 with multiband transmission. The pane 10 has an outer de-coated structure 4.1 with an inner de-coated structure 4.2. Another outer de-coated structure 4.3 is arranged inside the inner de-coated structure 4.2 and another inner de-coated structure 4.4 is arranged inside the other outer de-coated structure 4.3. The de-coated structures 4.1-4.4 have a square shape and are arranged concentrically with one another. The distance $b_1$ between the outer de-coated structure 4.1 and the inner de-coated structure 4.2 is 1 mm, and the distance $b_2$ between the outer de-coated structure 4.3 and the inner de-coated structure 4.4 is 1 mm. The length of the outer de-coated structure 4.1 is 42 mm and the length $l_2$ of the other de-coated structure 4.3 was 22 mm. The quotient of $b_1/l_1$ is, here, for example, 1 mm/42 mm and is thus less than ⅕. The distance h between adjacent regions 9 is 2 mm. The signal curve shows two minima in the transmission attenuation. The first minimum has a transmission attenuation of 6.7 dB at 0.76 GHz. The second minimum has a transmission attenuation of 6.7 dB at 2.3 GHz. Such a pane 10 according to the invention thus has improved transmission for multiple frequency ranges and, in this example, for two frequency ranges.

FIG. 21 depicts a schematic representation of a detail of a pane 10 according to the invention in plan view. One hexagonal outer de-coated structure 4.1 and one hexagonal inner de-coated structure 4.2 as well as another hexagonal outer de-coated structure 4.3 and another hexagonal inner de-coated structure 4.4 are depicted. The hexagonal structures 4.1-4.4 are, in each case, regular hexagons with equally long sides and are arranged concentrically with one another. Needless to say, their center can also be arranged offset. The distance $b_1$ between the outer de-coated structure 4.1 and the inner de-coated structure 4.2 is, for example, 1.5 mm. The distance $b_2$ between the other outer de-coated structure 4.3 and the other inner de-coated structure 4.4 is also, for example, 1.5 mm. Needless to say, the distances $b_1$ and $b_2$ need not be equal. The length of the outer de-coated structure 4.1 is, for example, 39 mm, and the length $l_2$ of the other outer de-coated structure 4.3 is, for example, 28 mm. The width d of the de-coated structures 4.1-4.4 is also, for example, constant and is 100 µm.

The outer de-coated structure 4.1 is completely surrounded in the region of its outer edge 14.1 and its inner edge 15.1 by the transparent electrically conductive coating 3. Here, "outer edge" 14.1 means the region that is situated outside the outer de-coated structure 4.1 and borders the outer de-coated structure 4.1. Accordingly, "inner edge" 15.1 means the region that is situated inside the inner de-coated structure 4.1 and borders the inner de-coated structure 4.1. Here, the inner de-coated structure 4.2 is, for example, likewise completely surrounded in the region of its outer edge 14.2 and its inner edge 15.2 by the transparent electrically conductive coating 3. The other outer de-coated structure 4.3 and the other inner de-coated structure 4.4 are likewise, in each case, completely surrounded in the region of their outer edge 14.3,14.4 and their inner edge 15.3,15.4 by the transparent electrically conductive coating 3. This means that the intermediate spaces between the outer de-coated structure 4.1 and the inner de-coated structure 4.2 as well as the other outer de-coated structure 4.3 and the other inner de-coated structure 4.4 are completely filled with the transparent electrically conductive coating 3. The pane 10 according to the invention has a section 11 with a plurality of the structures 4.1-4.4 depicted here, see, for example, FIG. 2.

FIG. 22 depicts a diagram of the transmission attenuation for a pane 10 according to the invention in accordance with FIG. 21 that was optimized for the GSM band from 820 MHz to 960 MHz as well as for the UMTS band from 1700 MHz to 2200 MHz. FIG. 22 shows, as Comparative Example 1, the transmission attenuation for a single glass pane 1' with a transparent, electrically conductive coating 3 without regions 9 with de-coated structures 4.1-4.4. The transmission attenuation is, at roughly 34 dB, very high such that, for example, no mobile telephony reception is possible behind this pane.

The transmission attenuation of the Example 3 of FIG. 21 is, at a frequency of 900 MHz, lower by 25 dB than in the Comparative Example 1 according to the prior art. Moreover, the transmission attenuation of the Example 3 of FIG. 21 is, at a frequency of 1.9 GHz, lower by 28 dB than in the Comparative Example 1 according to the prior art. This means that the transmission attenuation was reduced by a factor of 19 or by a factor of 27, respectively, without the vision through the pane 10 and its optical properties being appreciably degraded.

This result was unexpected and surprising for the person skilled in the art.

LIST OF REFERENCE CHARACTERS

1 composite pane
1' single pane
1.1 first pane,
1.2 second pane
2 intermediate layer
3 transparent, electrically conductive coating
4 de-coated region
4.1 outer de-coated structure
4.2 inner de-coated structure
4.3 another outer de-coated structure
4.4 another inner de-coated structure
5 edge de-coating
6 carrier film
7 A-field of view
8 de-coated line
9 region
10 pane
11 section
12 pane according to the prior art
13 arrangement
14.1,14.2,14.3,14.4 outer edge
15.1,15.2,15.3,15.4 inner edge
α angle
A-A' section line
$b, b_h, b_v, b_1$ distance between outer de-coated structure 4.1 and inner de-coated structure 4.2
$b_2$ distance between another outer de-coated structure 4.3 and another inner de-coated structure 4.4
d line width of a de-coated structure 4.1,4.2,4.3,4.4
$\in_{eff}$ effective relative permittivity
h distance between adjacent regions 9
$l, l_1, l_2$ length or width of a de-coated structure 4.1,4.2,4.3
λ wavelength
Y detail
detail
I outer face of the second pane 1.2
II inner face of the second pane 1.2
III outer face of the first pane 1.1
IV inner face of the first pane 1.1
V face of the intermediate layer 2
VI face of the intermediate layer 2

The invention claimed is:

1. A pane, comprising:
   at least one first pane with an outer face and an inner face,
   at least one transparent, electrically conductive coating, which is arranged on at least one of the outer face and the inner face of the first pane, and
   at least one region with at least one outer de-coated structure and one inner de-coated structure, wherein the outer de-coated structure and the inner de-coated structure have a same shape,
   wherein the transparent, electrically conductive coating is situated between the outer de-coated structure and the inner de-coated structure,
   wherein the region between the outer de-coated structure and the inner de-coated structure is completely filled with the transparent, electrically conductive coating, and
   wherein the inner de-coated structure is completely surrounded on its inner edge by the transparent electrically conductive coating.

2. The pane according to claim 1, wherein the outer de-coated structure and the inner de-coated structure have the shape of a square, a rectangle, a rhombus, a trapezoid, a hexagon, an octagon, a cross, an oval, or a circle.

3. The pane according to claim 1, wherein a distance of the outer de-coated structure from the inner de-coated structure is from 0.5 mm to 30 mm.

4. The pane according to claim 3, wherein a distance of the outer de-coated structure from the inner de-coated structure is from 1 mm to 5 mm.

5. The pane according to claim 3, wherein a distance of the outer de-coated structure from the inner de-coated structure is constant.

6. The pane according to claim 1, wherein a line width of at least one of the outer de-coated structure and of the inner de-coated structure is from 25 μm to 300 μm.

7. The pane according to claim 6, wherein the line width of the at least one of the outer de-coated structure and the inner de-coated structure is from 30 μm to 140 μm.

8. The pane according to claim 1, wherein a minimum distance between adjacent regions is from 1 mm to 100 mm.

9. The pane according to claim 8, wherein a minimum distance between adjacent regions is from 1 mm to 20 mm.

10. The pane according to claim 1, wherein the transparent, electrically conductive coating has at least four regions.

11. The pane according to claim 10, wherein the transparent, electrically conductive coating has 10 to 50 regions.

12. The pane according to claim 10, wherein the regions are arranged horizontally.

13. The pane according to claim 10, wherein the regions are arranged vertically.

14. The pane according to claim 1, wherein the at least one first pane contains glass, polymers, or mixtures thereof.

15. The pane according to claim 14, wherein the at least one first pane contains flat glass, float glass, quartz glass, borosilicate glass or soda lime glass.

16. The pane according to claim 14, wherein the at least one first pane contains polyethylene, polypropylene, polycarbonate or polymethyl methacrylate.

17. The pane according to claim 14, wherein the at least one first pane has an effective relative permittivity $\epsilon_{eff}$ from 2 to 8.

18. The pane according to claim 14, wherein the at least one first pane has an effective relative permittivity $\epsilon_{eff}$ from 6 to 8.

19. The pane according to claim 1, wherein a length of at least one of the outer de-coated structure and the inner de-coated structure is from 10 mm to 150 mm.

20. The pane according to claim 1, wherein the transparent, electrically conductive coating contains:
   (i) at least one metal, or
   (ii) at least one metal oxide layer, or
   (iii) carbon nanotubes, or
   (iv) optically transparent, electrically conductive polymers, or
   (v) mixtures of at least two of (i) to (iv).

21. The pane according to claim 20, wherein the transparent, electrically conductive coating contains silver, nickel, chromium, niobium, tin, titanium, copper, palladium, zinc, gold, cadmium, aluminum, silicon, tungsten, or alloys thereof.

22. The pane according to claim 20, wherein the transparent, electrically conductive coating contains tin-doped indium oxide (ITO), aluminum-doped zinc oxide (AZO), fluorine-doped tin oxide (FTO, $SnO_2$:F), antimony-doped tin oxide (ATO, $SnO_2$:Sb).

23. The pane according to claim 20, wherein the transparent, electrically conductive coating contains poly(3,4-ethylenedioxythiophenes), polystyrene sulfonate, poly(4,4-dioctyl cylopentadithiophene), 2,3-dichloro-5,6-dicyano-1,4-benzoquinone, mixtures or copolymers thereof.

24. A composite pane at least comprising:
   the pane according to claim 1 and
   a second pane, which is areally bonded to the pane via at least one intermediate layer.

25. A method, comprising:
   applying the pane according to claim 1 as a glazing with low transmission attenuation for high-frequency electromagnetic radiation, in a vehicle body or in a vehicle door of a means of transportation on land, on water, or in the air, in buildings as part of an external façade or of a building window, or as a built-in part in furniture and appliances.

26. The pane according to claim 1, wherein the outer de-coated structure and the inner de-coated structure are arranged concentrically to one another.

27. The pane according to claim 1, wherein the at least one region has an area that has an area fraction of 7% to 25% of the pane.

28. The pane according to claim 1, wherein a length l of at least one of the outer de-coated structure and the inner de-coated structure is from $\lambda/(7*\sqrt{\epsilon_{eff}})$ to $(3*\lambda)/(2*\sqrt{\epsilon_{eff}})$ and/or a ratio of a distance b between the outer de-coated structure and the inner de-coated structure, to the length l, is less than or equal to ⅕, wherein λ indicates a wavelength of a transmission signal with low attenuation through the pane and $\epsilon_{eff}$ indicates an effective relative permittivity of the pane.

29. The pane according to claim 1, wherein a ratio of a distance b between the outer de-coated structure and the inner de-coated structure, to a length l of at least one of the outer de-coated structure and the inner de-coated structure, is less than or equal to ⅕.

30. The pane according to claim 1, wherein the transparent, electrically conductive coating has a sheet resistance from 0.35 ohm/square to 200 ohm/square.

31. The pane according to claim 1, wherein the transparent, electrically conductive coating has a sheet resistance from 0.6 ohm/square to 30 ohm/square.

32. A method for producing a pane, the method comprising:
   providing at least one first pane with an outer face and an inner face;
   providing at least one transparent, electrically conductive coating;
   applying a transparent, electrically conductive coating on the outer face or the inner face of the at least one first pane; and
   introducing at least one region with at least one outer de-coated structure and one inner de-coated structure into the at least one transparent, electrically conductive coating,
   wherein the at least one transparent, electrically conductive coating is situated between the outer de-coated structure and the inner de-coated structure,
   wherein the outer de-coated structure and the inner de-coated structure have a same shape,
   wherein the region between the outer de-coated structure and the inner de-coated structure is completely filled with the transparent, electrically conductive coating, and
   wherein the inner de-coated structure is completely surrounded on its inner edge by the transparent electrically conductive coating.

33. The method for producing a pane according to claim 32, wherein the at least one outer de-coated structure and one inner de-coated structure are introduced into the at least one transparent, electrically conductive coating, by laser patterning.

34. The method for producing a pane according to claim 32, wherein the applying of the transparent, electrically conductive coating, comprises:
   providing a carrier layer;
   applying the at least one transparent, electrically conductive coating on the carrier layer; and
   aerially bonding the carrier layer to the first pane.

35. The method for producing a pane according to claim 34, wherein the aerially bonding the carrier layer comprises:
   providing an intermediate layer; and
   aerially bonding the carrier layer to the first pane via the intermediate layer.

* * * * *